United States Patent [19]

Curley et al.

[11] 3,820,078

[45] June 25, 1974

[54] MULTI-LEVEL STORAGE SYSTEM HAVING A BUFFER STORE WITH VARIABLE MAPPING MODES

[75] Inventors: John L. Curley, Sudbury; Thomas J. Donahue, Huson, both of Mass.; Wallace A. Martland, Nashua, N.H.; Benjamin S. Franklin, Boston, Mass.

[73] Assignee: Honeywell Information Systems, Inc., Waltham, Mass.

[22] Filed: Oct. 5, 1972

[21] Appl. No.: 295,301

[52] U.S. Cl. .............................................. 340/172.5
[51] Int. Cl. .............................................. G06f 13/06
[58] Field of Search .................................. 340/172.5

[56] References Cited

UNITED STATES PATENTS

| | | | |
|---|---|---|---|
| 3,238,510 | 3/1966 | Ergott, Jr. | 340/172.5 |
| 3,380,030 | 4/1968 | McMahon | 340/172.5 |
| 3,387,283 | 6/1968 | Snedaker | 340/172.5 |
| 3,525,985 | 8/1970 | Melliar-Smith | 340/172.5 |
| 3,541,518 | 11/1970 | Bell et al. | 340/172.5 |
| 3,618,041 | 11/1971 | Hisashi Horikoshi | 340/172.5 |
| 3,670,309 | 6/1972 | Amdahl et al. | 340/172.5 |
| 3,675,215 | 7/1972 | Arnold et al. | 340/172.5 |
| 3,699,533 | 10/1972 | Hunter | 340/172.5 |
| 3,723,976 | 3/1973 | Alvarez et al. | 340/172.5 |

*Primary Examiner*—Paul J. Henon
*Assistant Examiner*—Melvin B. Chapnick
*Attorney, Agent, or Firm*—Nicholas Prasinos; Ronald T. Reiling

[57] ABSTRACT

A multi-level storage system providing multiple levels of storage comprising a high-speed low capacity storage device (buffer store) coupled serially to successive levels of lower speed, higher capacity storage devices including means for varying key physical buffer store parameters such as mapping, replacement algorithm, and buffer store size. The buffer store is capable of being accessed in a plurality of modes, each mode being under the dynamic control of a program being executed. An additional mode under control of the software or a switch in the maintenance panel is also provided for bypassing the buffer memory.

40 Claims, 15 Drawing Figures

MULTI-LEVEL STORAGE SYSTEM HAVING A BUFFER STORE WITH VARIABLE MAPPING MODES

BACKGROUND OF THE INVENTION

1. Field of the Invention

This invention relates generally to computer multi-level storage systems and more particularly to storage hierarchies having a high speed low capacity storage device coupled to successive levels of lower speed, high capacity storage devices.

2. Description of the Prior Art

The storage hierarchy concept is based upon the observed phenomenon that individual stored programs, under execution, exhibit the behavior that in a given period of time a localized area of memory receives a very high frequency of usage. Thus a memory organization that provides a relatively small size high speed buffer at the central processing unit (CPU) interface and the various levels of increasing capacity slower storage can provide an effective access time that lies somewhere in between the range of the fastest and the slowest elements of the hierarchy and provides a large capacity memory system that is "transparent" to the software.

To date all noteworthy storage level implementations of the invisible storage hierarchy storage system have consisted of the IBM 360/85, 370/155 and 370/165 which consist of two levels of storage, the first level of storage consisting of a high speed solid state buffer termed a "cache memory," high speed associative logic techniques and high speed control logic to control the fully interleaved two by four by eight way, second level stored. The second level store in the 360 system is bulk core storage and in the 370 systems can be either bulk core or metal oxide semiconductor integrated chips (MOSIC). A general description of the system/370 model 165 (cache memory) can be found on pages 214–220 of a book by Harry Katzen, Jr. entitled "Computer Organization and the System 370" and published in 1971 by Van Nostrand Reinhold Company. The IBM 360/85 is described generally on pages 2–30 of IBM System Journal, Volume 7, No. 1, 1968.

Some mapping schemes for buffer store can be found in an article by C.J. Conti on storage hierarchies entitled "Concepts for Buffer Storage" and published in Computer Group News, March 1969, pages 10–13. Briefly a sector mapping scheme is described which requires large scale associative techniques of large scale integrated content-addressable memories (LSICAM) implementation or discrete logic type implementation; this technique is utilized in some of the 360/85 systems. Two and four level set associative algorithm techniques for buffer store mapping are utilized in the 370/155, 165; these techniques are also described in the above mentioned Conti article and may be implemented by a two or four level ranked comparator implementation. Memory block replacement in all cases is of the least recently used (LRU) block type, whereas a least frequently used (LFU), a working set, and a first in-first out (FIFO) arrangement may be utilized for replacement algorithms.

In prior art buffer store systems of which the Applicants are aware the buffer store performs local and store operations in one mode upon command from the central processing unit (CPU). Whenever a CPU performs a load operation and the addressed information resides in the buffer store, the buffer store presents the information to the CPU at the higher buffer memory speed. If the addressed information does not reside in buffer store, control circuitry in the buffer store effects a transfer of a block of information from main store (MS) to buffer store and gives the CPU the requested information from this block. For CPU store operations, the information is sent from the CPU to MS. If the addressed location for this store operation is in the buffer, then that buffer store location is also updated.

It is sometimes desirable to completely by-pass buffer store when for some reason or another it becomes inoperable; or it is sometimes desirable to reduce the buffer memory size where the customer's needs permit lower performance in order to effect lower cost. Moreover in solving certain problems the full "cache" mapping technique is not necessary and a full block load need not be loaded into buffer store subsequent to each read miss.

OBJECTS

It is an object, therefore, of the invention to provide an improved multi-level storage system.

It is another object of the invention to provide a device having a multi-level storage system capable of multi-mode mapping of buffer store.

It is still another object of the invention to provide a device having a multi-level storage system capable of dynamically bypassing buffer store.

Yet another object of the invention is to provide a device having a multi-level storage system wherein the buffer store capacity is variable.

Other objects and advantages of the invention will become apparent from the following description of the preferred embodiment of the invention when read in conjunction with the drawings contained herewith.

SUMMARY OF THE INVENTION

The foregoing objects are achieved, according to one embodiment of the instant invention by providing for multiple levels of storage comprising a high speed low capacity buffer store coupled serially to successive levels of lower speed, higher capacity devices, and including means for varying key physcial buffer store parameters such as mapping, replacement algorithm and buffer size.

A buffer store module normally is arranged in two modules of 128 columns each, with each column capable of storing one block of information comprising 32 bytes per block. The buffer store has means for operation in normal mode generally referred to as $128 \times 2 \times 32$, i.e. two modules of 128 columns each storing one block per column. Another mode of operation is the $128 \times 2 \times 16$ wherein the buffer store has two modules of 128 columns each column storing one/half a block, i.e. 16 bytes, per column. Another mode of operation is the $256 \times 2 \times 16$ mode wherein the buffer store has two modules of 256 columns, each column containing half a block of information, 16 bytes. The normal mode loads and accesses the backing store modules for either 16 or 32 bytes; thus giving a micro programmer greater flexibility for individual instruction performance optimization in micro programming. A Non-Allocate Mode — 8 byte fetch where 4 byte-groups are temporarily stored in Cache in a mode which forces all Cache references to "miss." Finally a mode is provided so that the buffer store may be completely by-passed.

BRIEF DESCRIPTION OF THE DRAWINGS

This invention will be described with reference to the accompanying drawings wherein.

DESCRIPTION OF A PREFERRED EMBODIMENT

General

Figure 1:
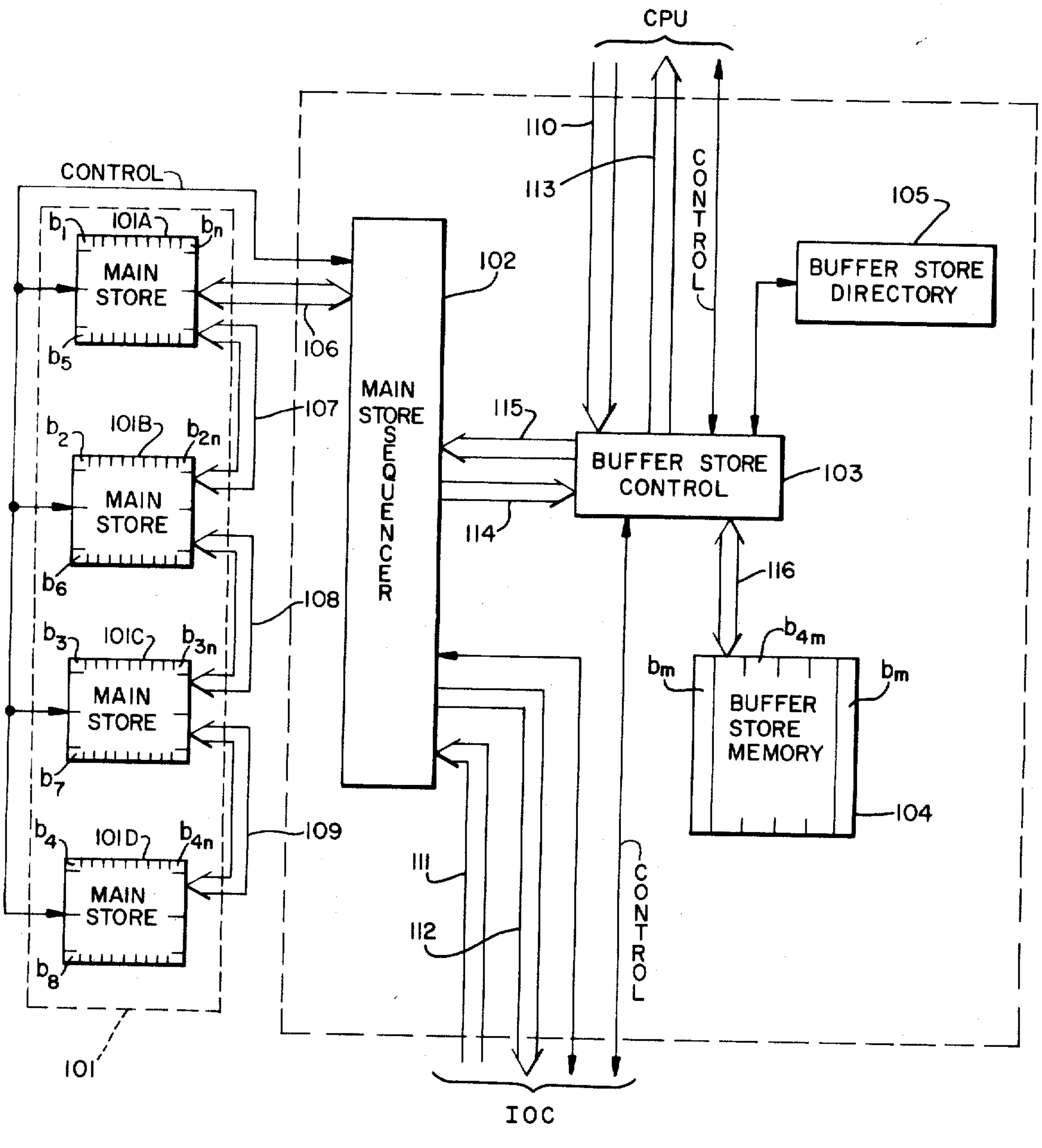
FIG. 1 is a block diagram of an overall view of the invention illustrating the multi-level storage system and controls thereof.

Referring to FIG. 1 there is shown in diagram format a multi-level storage system providing for multiple levels of storage comprised herein of the buffer store 104 and the main (back-up) store 101. The buffer store memory 104 is typically a semiconductor bipolar random access memory array of 8192 bytes. The cycle time of the buffer memory is typically 150 nanoseconds having a typical access time of 95 nanoseconds. The main store 101 is normally a four-way interleaved random access memory comprised of four MOS memory modules 101A – D. The main store is typically organized so that 32 consecutive bytes are spread over the four storage units 101, i.e. location 0 is in storage unit 101 A; location 8 is in storage unit 101 B, etc . . . Cycle time of the main memory 101 is typically 0.8 microseconds. It can be readily observed that the buffer store 104 is a high speed memory which is several times faster than the main memory (back-up) store.

A buffer store directory 105 is utilized to store high order bits of addresses of the data that is stored in buffer store 104. The buffer store directory 105 comprises typically an array of 128 × 36 bits and has a cycle time of 150 nanoseconds with an access time of 95 nanoseconds. The buffer store 104 has as its main function the storage of the contents of those parts of main store 101 currently being used by the processor; therefore the processor can fetch a great majority of the information it needs by accessing the high speed buffer store memory 104. When the program shifts its operations from those requiring the information from that portion of main memory currently in buffer store memory to those operations requiring information currently residing in another portion of main memory, then that portion of main memory is loaded into the buffer store memory. The main store sequencer 102 (which is the subject of another invention invented by others at Honeywell Information Systems Inc. and is the subject of another application) provides the interface between the main store 101 and the buffer store control 103. Data paths 106, 107, 108 and 109 between the modules of the main store and between the main store 101 and the main store sequencer 102 are 8 bytes wide which may change to 16 bytes; moreover data paths 114 and 115 between the main store sequencer 102 and buffer store 103, between buffer store control 103 and buffer store memory 104, and between the main store sequencer 102 and the input/output control unit IOC, (not shown) are 8 bytes wide. Data paths 110 from the central processing unit CPU (not shown) and the buffer store control unit are also typically 8 bytes wide; however data path 113 from the buffer store control unit to the CPU is four bytes wide. Data paths 116 from Buffer Store Control to Buffer Store Memory are 8 bytes wide. Other data paths 111 and 112 provide data transfer from the IOC (not shown) to main store sequencer and vice versa respectively.

Because individual stored programs in back-up store (in this instance main store 101) which are under execution at a given time are generally to be found in a localized area or in areas dispersed throughout the available memory of main memory 101; that area is more likely to be in buffer store memory 104 during current program execution and by accessing the currently required information from buffer store memory 102, the effective main storage access time is significantly reduced.

The input/output control unit IOC (not shown) does not directly reference the buffer store memory 104, but rather it communicates with main store 101 via main store sequencer 102; consequently the buffer store 104 is purged whenever store operations are made into memory locations currently being executed and contained by the buffer store 104.

In the storage hierarchal system of FIG. 1, only two levels are shown, buffer store 104 and main store 101, although many other levels may be used. Generally the highest level store is termed the local store, sometimes also known as the "cache" memory, whereas the lowest level store is known as the backing store. The highest level store has generally the fastest access time but also generally has the smallest storage capacity. In FIG. 1, since there are only two levels of storage the "cache" corresponds to buffer store memory 104 and the back-up store corresponds to main store 101. Each storage device in the hierarchy is partitioned logically into blocks $b_n$, each block being comprised of 32 bytes. The buffer store in normal mode is typically organized into two 128 column modules (see later discussion). Each column of buffer store may contain one block of information consisting of 32 bytes. The main store 101 may contain many blocks $b_n$ of 32 byte information arranged in columns and rows.

Figure 2A:
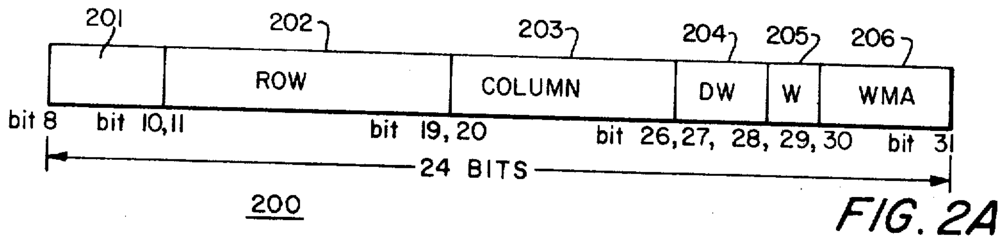
FIGS. 2A and 2B are block diagrams illustrating address arrangements utilized by the invention.

Referring now to FIG. 2A there is shown a block diagram of an address structure 200 utilized to address the buffer store memory 104. The structure of FIG. 2A is an address of the system, that identifies an address space in the buffer store 104 and relates that buffer address to an address in main store 101. The address structure 200 is typically 24 bits in length. It begins with bit 8, because prior bits are not pertinent to the address. Address field 201 comprises bits 8 through 10 — a total of 3 bits. Address field 201 is a reserved address space to provide additional addressing capacity for addressing from an expanded main store. Row address field 202 consists typically of bits 11 through 19 — a total of 9 bits; whereas column address field 203 consists typically of bits 20 through 26 — a total of 6 bits. Double word address field 204 consists typically of two bits numbered 27 and 28; word address field 205 consists typically of one bit numbered 29; and byte address field 206 consists typically of two bits 30 and 31. (The functions of these address fields will be described infra.)

Figure 2B:
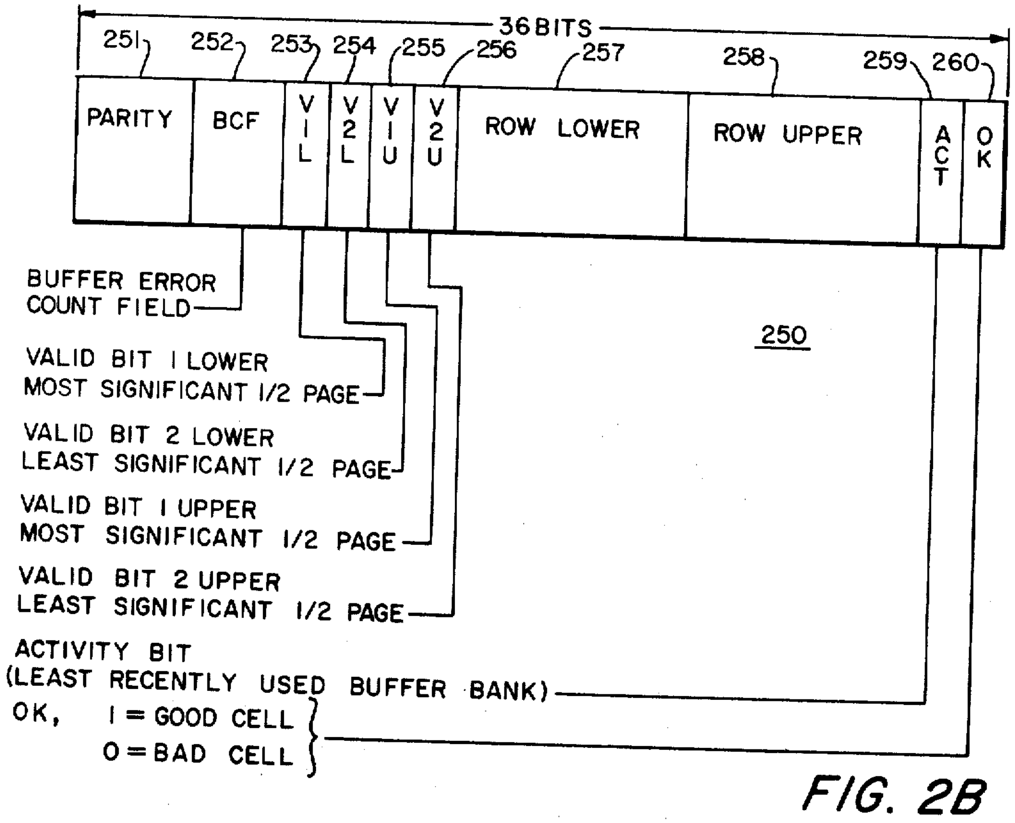

Referring now to FIG. 2B there is shown a typical structure of an address space 250 typically contained in a portion of buffer store directory 105. The address space 250 is typically 36 bits in length and typically comprises a four bit parity field 251, a two bit buffer count field 252, four validity one bit fields 253 - 256, a twelve bit row lower field, a 12 bit row upper field, a one bit activity field 259, and a one bit OK field 260. Column field 203 (FIG. 2A) is used to address buffer store directory 105; by utilizing bits 27 and 28 together with column field 203 the buffer store 104 may also be addressed; row field 202 of address space 200 is used for comparison to row lower field 257 and row upper field 258 which are resident in buffer store directory 105. A successful comparison is herein termed a "hit" and indicates that the required information of main memory whose address resident at the row field 202 of address space 200 is also resident in buffer store and is located in a column of buffer store 104 designated by column field 203. The parity field 251 is utilized to ascertain the correctness of information contained in the address space 250. A parity bit is formed on the following bit fields: buffer count field 252, valid bit fields 253, 254, 255, and 256, and OK field 260. When reading a directory word, parity is checked against these bits. On the remaining 24 bits the three parity bits are checked when reading, and regenerated when writing into the directory. The buffer count field 252 stores possible error occurrences with respect to a particular buffer store directory location. Three error occurrences are stored and permitted and on the fourth error occurrence that particular location in the buffer store directory to which reference is made is invalidated. Validity bits 253 and 255 point to row upper location while validity bits 254 and 256 point to row lower locations, and are utilized to indicate the validity of data contained in the referenced location. For example, when a "hit" (successful compare) is made in buffer store directory, the validity bits for that location are also examined; if a logical "1" is present the data in buffer store is valid and may be utilized, but if a logical "0" is present it indicates that the data in buffer store is not valid or representative of the comparable data in main store because of possible alteration of that main store location by an input/output (I/O) unit or because of other errors or it has never been loaded. The activity field 259 indicates the least recently used upper or lower rows in the buffer store directory and is utilized as part of the algorithm that selects a location to write in new data when a "no hit" (unsuccessful compare) occurs. The OK bit 260 indicates that the word associated with it has no errors i.e. the word 250 has not been invalidated by an error field. A logical "1" indicates the error count has not been exceeded; a logical "0" indicates errors.

Figure 3:
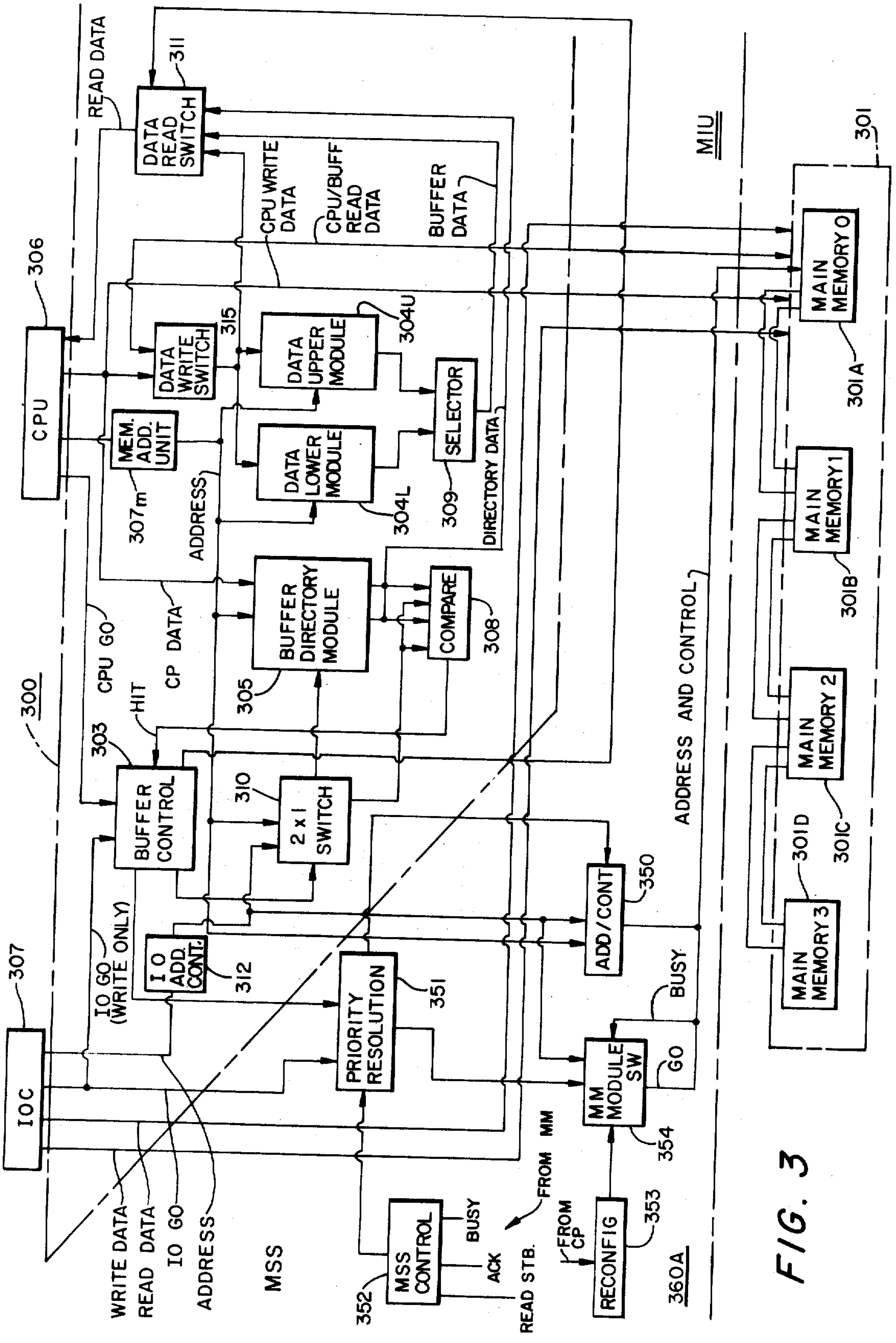
FIG. 3 is a more detailed block diagram of the major components of the invention.
Figure 4:
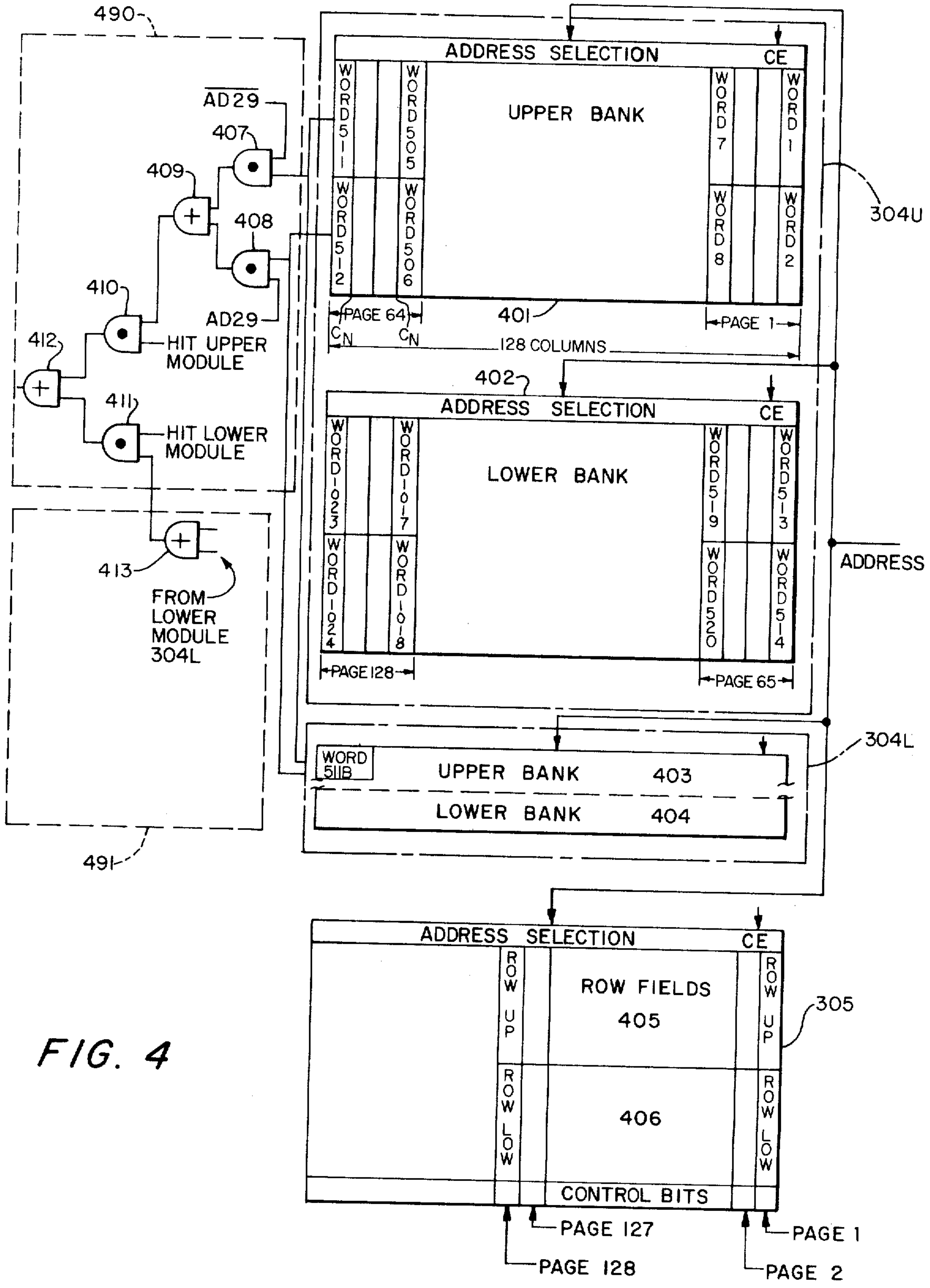
FIGS. 4, 5, 6 and 7 are detailed logic block diagrams illustrating features of the invention.

Referring now to FIGS. 3 and 4, the CPU 306 issues an address comprising bits 8–29 of FIG. 2A together with a command for action by the buffer store system 300. The issued address is stored in memory address unit **307*m* which contains storage flip-flops, decode logic appertunent logic circuitry (not shown) and generates signals, by means known in the art, for addressing generally the data upper module 304U, data lower module 304L, and the buffer directory module 305. (The data upper and lower modules 304U and 304L are more detailed views of buffer store memory 104 of FIG. 1.) Bits 20–26 of FIG. 2A are utilized to address the buffer directory module 305, bits 20–29 are utilized to address the data buffer modules 304U and 304L, (note the reuse of bits 20–26 for this purpose) and bits 8–19 are utilized for comparison via compare unit 308 to information stored in buffer directory module 305.**

Referring to FIG. 4 the data upper and lower modules 304U and 304L are further subdivided to upper and lower banks 401, 402 and 403, 404 respectively; whereas buffer directory module 305 is further subdivided into row upper fields 405 and row lower fields 406. Each of the data in row upper and lower fields 405 and 406 which comprise information arranged in row upper and lower fields 258 and 257 respectively in accordance with word type 250 of FIG. 2B, are compared in comparator 308 to the data contained in the row address field 202 of word type 200 issued by the CPU 306. If a successful compare "hit" results, it may be a hit upper or a hit lower, indicating that the successful compare was with row upper 405 or row lower 406 respectively of buffer directory module 305 and that the information desired is in buffer store in the data upper module or data lower module depending on which row (upper or lower) of the buffer directory the "hit" occurred. (Note that a hit in "row upper or row lower" of the buffer store directory indicates the information is in either the upper or lower module 304U or 304L respectively but does not indicate the row—i.e. bank upper or bank lower—within the upper or lower module.) When a hit occurs one word comprising 8 bytes of data may be read out into selector 308 from any one of the data module banks. However it will be noted from prior description that while data from the CPU to the buffer store is over an 8 byte path (used generally for write operations into buffer), data from the data buffer store to the CPU is transmitted over a path only 4 bytes wide (used typically in reading from buffer and supplying information to CPU). Moreover it will be noted from FIG. 4 that each upper and lower module 304U and 304L respectively are further organized into 128 columns, each column capable of holding one block of information i.e. 32 bytes. Each upper and lower module 304U and 304L respectively is further subdivided into upper and lower banks (i.e. rows of the upper or lower module) 401, 402, 403, and 404 respectively, having the same 128 columns as the data modules 304U and 304L, but each column of each bank contains two words, i.e. 16 bytes; hence each bank (i.e. row of each buffer store module) contains 2048 bytes, with each data module containing 4096 bytes, and with the entire buffer store memory 108 containing 8192 bytes.

Assuming, for example, that a hit upper occurs in the directory 305 referencing word 511 in upper bank 304U, and the CPU has requested a read operation, i.e. desires 4 bytes that currently reside at the addressed location, and moreover desires the first 4 bytes of word 511 located in upper bank 401 of upper data module 304U. (If a full 8 bytes were needed as in write operations, bits 27, 28 would be utilized thus addressing the entire upper module 304U.) In this example, address bit 29 of FIG. 2A is not set, i.e. is represented by a logical "0;" hence a low signal representing address bit 29 and AND gate 407 provides an enabling signal on one of the terminals of AND gate 407 and a disabling signal on one terminal of AND gate 408. Hence with the upper banks of upper and lower modules 304U and 304L respectively, selected, and with address bit 29 not set therefore referencing 4 bytes on the same column of two different modules i.e. words 511 and 512, a conflict results since at this juncture there is no way of knowing whether or not to dleiver 4 bytes from the upper bank of the upper module or the lower module. The conflict is resolved by AND gates 410 and 411 respectively which has an enabling signal on one or the other of the gates depending upon which module — upper or lower — is referenced by the hit in directory 305. In this instance AND gate 410 is enabled, since the hit referenced the upper module, and the first four bytes of word 511 are selected. Note that logic circuitry 490 is the upper bank selection circuitry of upper and lower modules, 304U and 304L whereas logic circuitry 491, only a part of which is shown since it is similar to logic circuitry, 490, is lower bank selection circuitry for upper and lower modules 304U and 304L. The next 4 bytes are selected by initiating a new operation by the CPU wherein the address is the same except address bit 29 which is the 1's complement of its state during the previous operation. When a write operation is requested an 8 byte word is required and this is selected by circuitry to be later described utilizing bits 27, and 28 of double word field 204.

When a no hit condition is encountered the data requested by the CPU is not in the buffer store and must be retrieved from main memory 301. Since main memory 301 is comprised of 4 modules 301A–301D, and since a block of information is normally 4-way interleaved with 8 bytes in each of the main memory modules, each of these modules must be accessed in order to retrieve a block of information. During the first access from one of the main memory modules 301A–301D, 8 bytes of data are obtained and loaded into the buffer store at an address selected by the CPU through data switch 315; also 4 bytes of data are delivered to the CPU through data switches 315 and 311 respectively. The address is then incremented and another main memory request is made and another 8 bytes of data are loaded into the buffer store but 4 bytes more are not delivered to the CPU as in the previous cycle; this procedure is repeated 2 more times (a total of 4 accesses) until one block of information has been written into buffer store and a word (one-eighth block) of information has been delivered to the CPU. To obtain the remaining information the CPU will continue to address buffer store but because an entire block of information has been delivered to buffer store, a hit will result and the information will then be delivered from buffer store without making further access to main memory 301 (assuming that it has not been purged by the I/O). The CPU addresses the buffer directory 305 through I/O address and control unit 312 and 2 × 1 switch 310. The 2 × 1 switch 310 permits the use of two addresses, one for the main memory 301 and the other for the buffer directory 305 with only one address being directed to the buffer directory of main memory.

Referring again to FIG. 3, CPU — 306 addresses the buffer directory module 305, via memory address unit 307. Memory address unit 307 is also utilized to address the adjust counter 350 and the 2 × 1 switch 310. When the CPU directs that data be written into the buffer store or into the main memory modules data write switch 315 is utilized to select the proper unit. The CPU — 306 may desire data from either the buffer store having data modules 304U, 304L, or from main memory 301 and the selection is accomplished by a data read switch 311. Sometimes it is necessary that the IOC unit 307 address buffer store I/O address control unit 312; this is accomplished by a 2 × 1 switch 310 which determines whether the CPU–306 or IOC–307 will be permitted to adjust the buffer directory module. If there is a conflict it is resolved through the priority resolution unit 351 in cooperation with the buffer control unit 303.

The main storage sequencer (MSS) generally denoted as 300A is the subject of another invention as hereinbefore mentioned and is included herewith for completeness and as background for the instant invention. An MSS control 352 is utilized to determine whether or not main memory is busy and to store and issue signal acknowledging request to main memory and providing information as to the current status of main memory. It also typically communicates with priority resolution unit 351, address counter 350, and data read switch 311. Reconfiguration unit 353 receives signals from the CPU and according to their request maps main memory 301 into various modes via main memory module switch 354. Address control unit 350 is under MSS control and is utilized to gate the I/O, CPU, or buffer store addresses, to the main memory 301.

Figure 5:
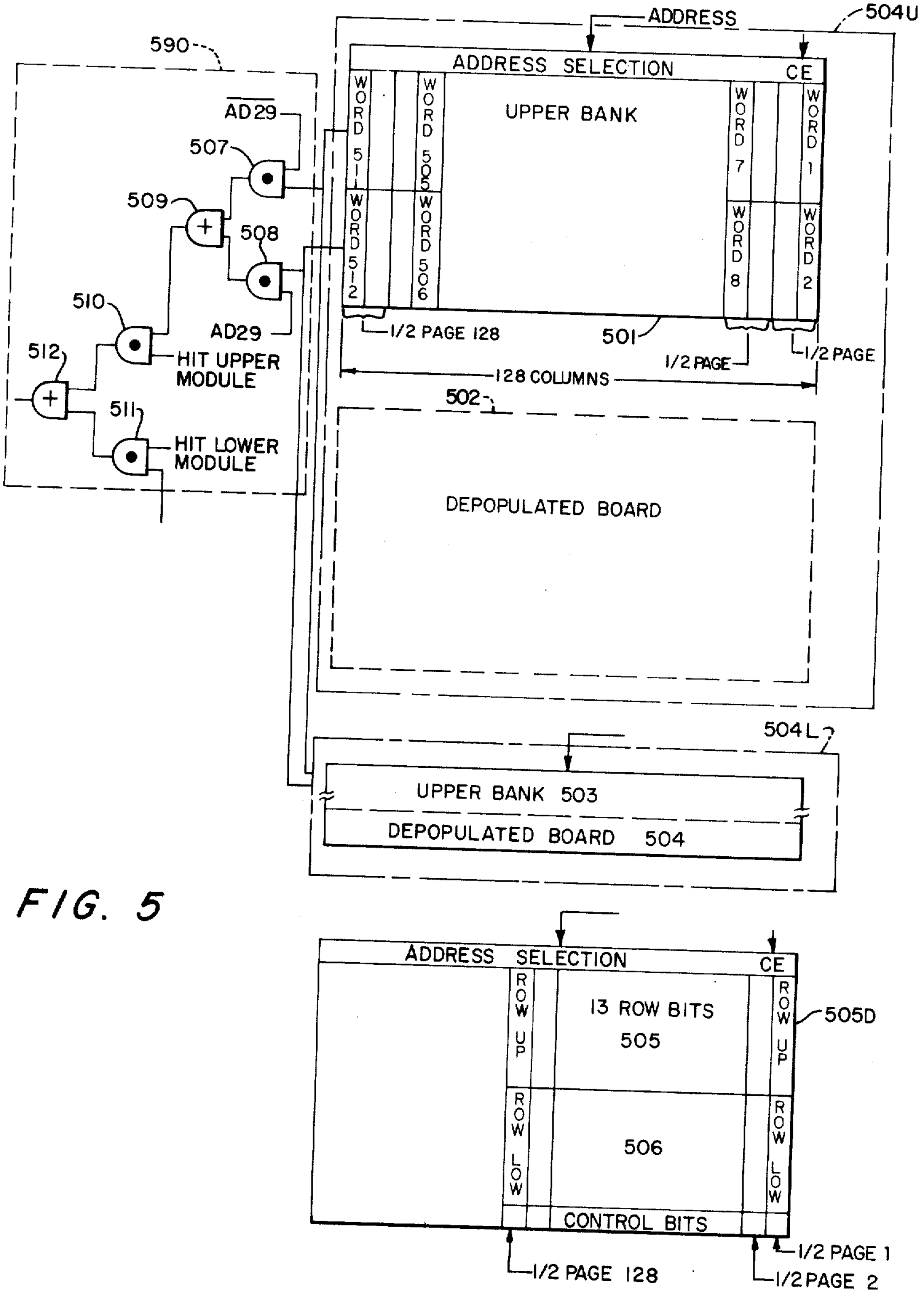

Referring now to FIG. 5 there is shown a second mode of operation of the buffer store memory system 300. When a user can trade off some speed and capacity in order to realize some economic benefits the mode sometimes called 128 × 2 × 16 is utilized. In this mode of operation there is half the buffer memory size of the previously described normal mode. For ease of understanding FIG. 5 has been arranged similar to FIG. 4; however, it will be noted that no lower banks exist in upper and lower modules 504U and 504L respectively. Hence there is 2048 bytes in upper bank 501 and 2048 bytes in upper bank 503 resulting in a total of 4096 bytes for the buffer memory 104. The terminology, again for convenience, of buffer store directory 505D has been left similar to the terminology of buffer store directory 305 of FIG. 4 since both make reference in accordance to fields 257 and 258 of address space 250 contained in buffer store directory rather than making reference to the buffer store memory 104. The information in row upper 505 and row lower 506 of buffer store directory 505D, however, do make reference to buffer store memory 104 and is utilized as previously described. It will be noted by further examining upper banks 504U and 504L respectively that there are 128 columns in both upper banks but each column is now capable of storing only a half of block or 16 bytes since the depopulated boards 502 and 504 are not utilized. The operation of this mode is similar to the normal mode previously described, however, there are only two accesses to either the upper or lower module because only a half of block of information need be read or written into cache in any one column of any one module. The word selection circuitry 590 of FIG. 5 is also different from the word selection circuitry 490 and 491 of FIG. 4 since only half the circuitry is needed to select the reference upper bank in either the upper or lower module. The mode of FIG. 5 is fixed at the factory and provides faster speeds since only 16 bytes need only be accessed in any column thus requiring half the number of accesses by the buffer.

Figure 6:
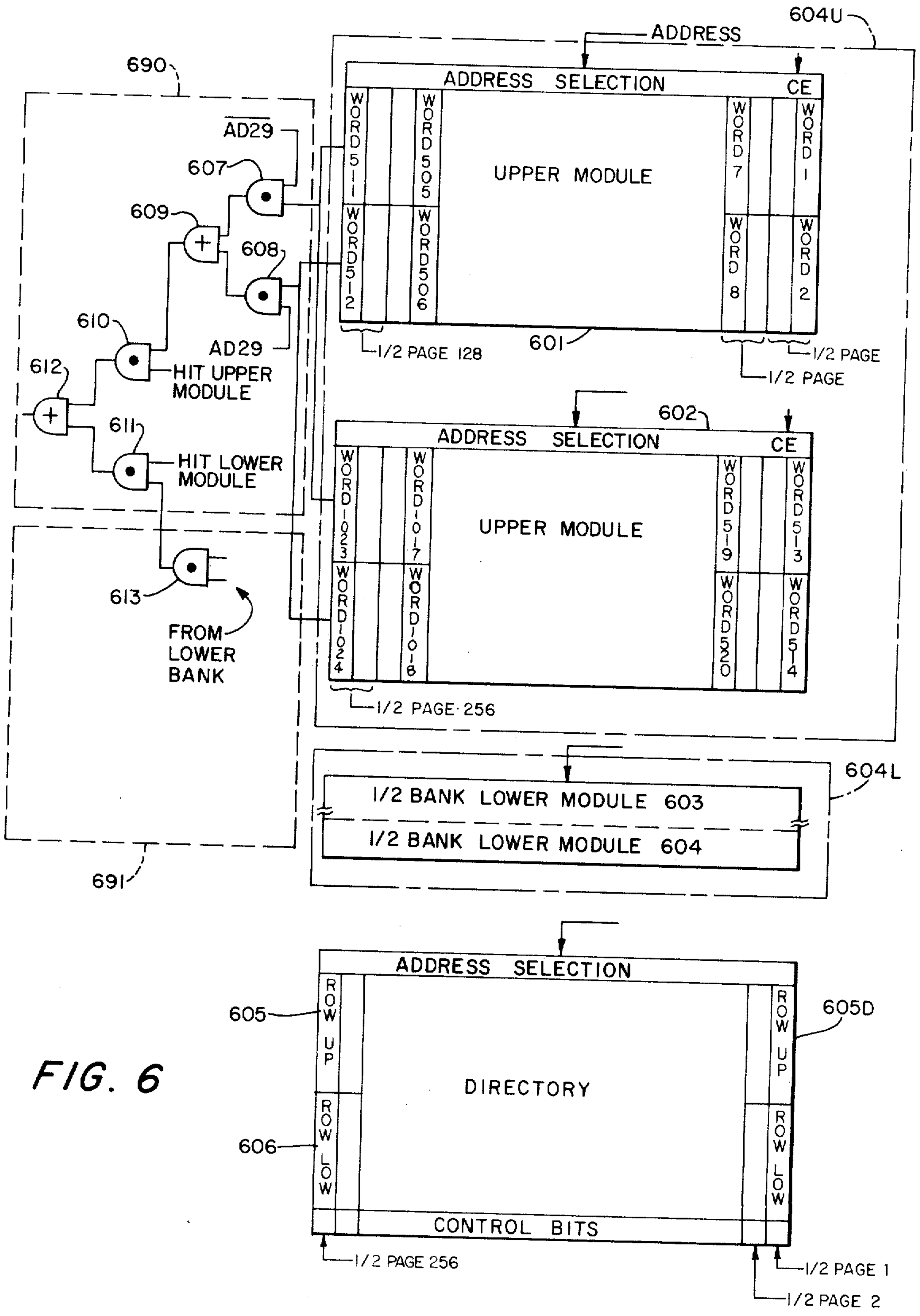

The mode of operation depicted in FIG. 6 is known as the 256 × 2 × 16 mode. Referring to FIG. 6 the upper and lower modules 604U and 604L are each arranged in 256 columns, each column capable of storing one 8 byte word. In other words each bank 601, 602 of upper module 604U has a capacity of 2048 bytes with each bank being 128 columns wide. The two banks, although shown in vertical relation one to the other in order to relate more easily to the other modes, are actually better pictured as arranged continuously from column 1 to column 256 with 8 byte words 1 and 2 in column 1 and 8 byte words 1023 and 1024 in column 256. The lower module 604L may be similarly pictured. The directory 605D in this mode utilizes the entire memory space alloted to it whereas in previous modes it will be noted that only half the memory's space alloted to it was utilized. The remaining elements such as the logic selection circuitry 690 and 691 is similar to that of FIG. 4. On a hit condition utilizing this mode of appropriate referenced column 1 through 256 is accessed 4 bytes of data is given to the CPU in the read mode. On a no hit condition main memory is accessed only twice and each time 8 bytes of data is loaded into the buffer store memory with 4 bytes being delivered to the CPU during the first MS access. Whereas this mode, the 256 × 2 × 16 mode, arrogates to itself the advantages of the 128 × 2 × 16 mode and eliminates the capacity disadvantage, it is nonetheless sometimes desirable to have the capability of loading or delivering from any referenced column either a full block or a half a block depending upon the requirements of the programmer. The mode of FIG. 7 the 128 × 2 × 32/16 mode is capable of performing in this manner.

Figure 7:
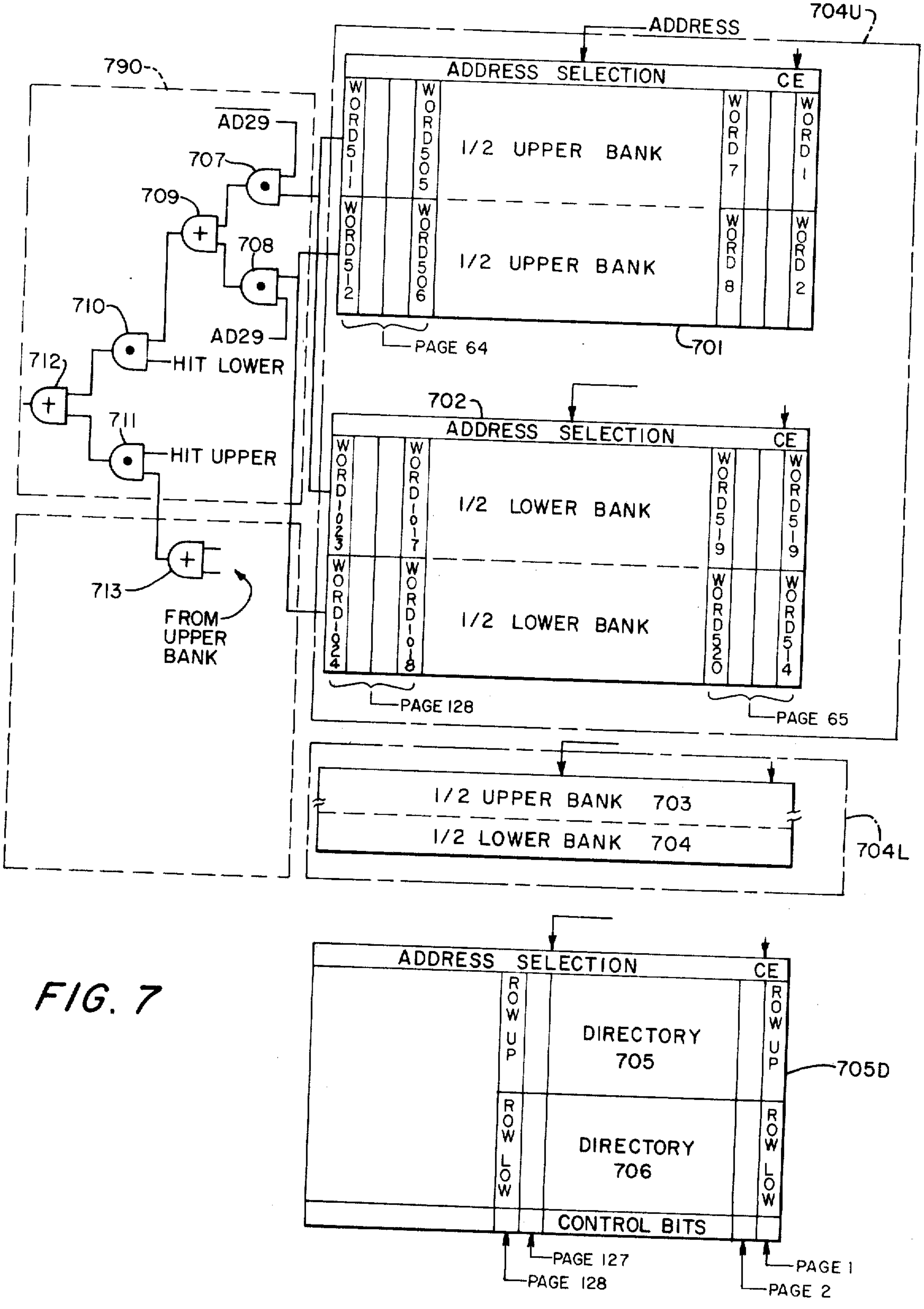

Referring to FIG. 7 the upper module 704U has an upper and lower bank 701, 702, however, each upper and lower bank is further subdivided in capacity resulting in two on half upper banks each having a capacity of one half the full bank. This division is effected in all banks of all modules. The remaining elements of FIG. 7 the selection circuitry 790 and 791 and the directory 705D are similar to the normal mode of FIG. 4. Thus the micro programmer has the modes of FIGS. 4, 6, and 7 to manipulate as the requirements of the micro program dictate. The mode of FIG. 5 as previously noted is predetermined and fixed at the time the system is acquired; however, it may be converted to the modes of FIGS. 4, 6, nd 7 by including the required additional lower banks and the selection circuitry therefor.

Figure 10:
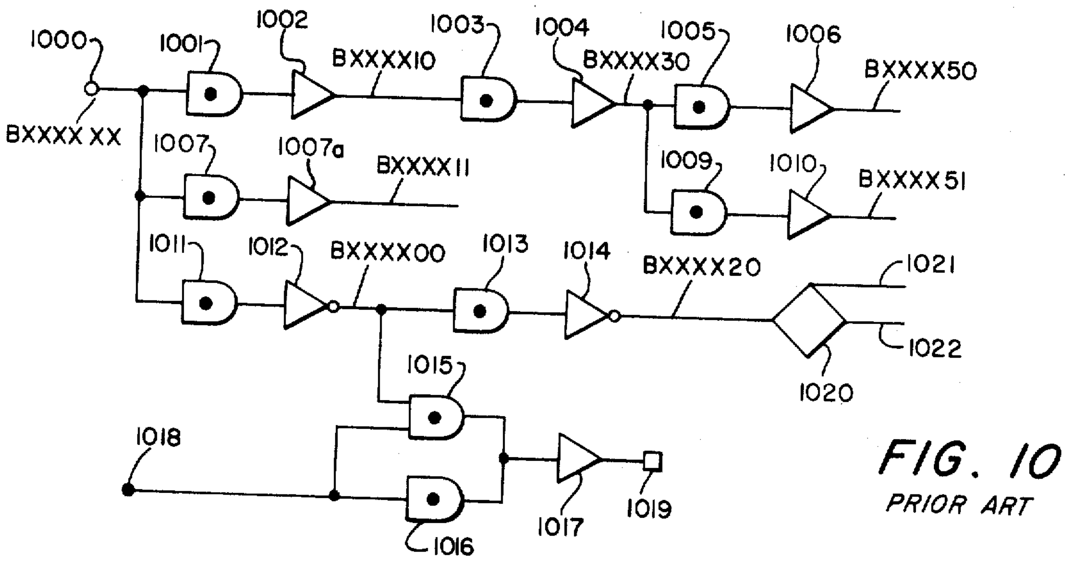
FIG. 10 PRIOR ART
FIG. 10 is a prior art schematic diagram showing the conventions for signals and symbols utilized in FIGS. 8A–8E.

Referring now to the FIG. 10 there is shown a prior art diagram of various circuits in order to illustrate the conventions utilized herein. In order to simplify the multitude of complex logic circuits required in a design of a specific computer and to automate the preparation and reading of such design plans once the design has been approved, PLEXEDIT listings of logic functions (i.e. logic signals) are utilized. From such PLEXEDIT listings detailed logic block diagrams such as shown on FIGS. 8A through 8E may be prepared, or logic block diagrams once designed, PLEXEDITS may be prepared. The technique for reading PLEXEDIT listings and utilizing them is described in book 3 of a book entitled "Computer Fundamentals," copyrighted 1969 by Honeywell Inc. FIG. 10 does not represent any specific circuit of the invention but a description of it and the conventions utilized will enable the person of ordinary skill in the art to read FIGS. 8A through 8E and practice the invention.

A signal BXXXXXX is applied at input terminal 1000. The signal has been given the name BXXXXXX where B and 1 or X may be any letter or numeral; generally the first two characters in this case BX specify a major and minor logic area or a major logic area and a logic function. In this instance, B indicates the major logic area belonging to the buffer store. The third, fourth and fifth X's are reserved to specify the function (i.e. logical signal), and this function name may be varied according to the needs of the designer. The next to the last character, in this particular instance the sixth position, provides information as to the state of the signal i.e., whether or not it is an assertion or negation. For example, when the signal BXXXXXX passes through AND gate 1001 and and through amplifier 1002 there is a first assertion. This first assertion is indicated by the next to the last character which in this case is a 1 (assertions are indicated by an odd number of the next to the last character and negations are indicated by an even number of the next to the last character). Following the BXXXXXX through AND gate 1003 and through another amplifier 1004 there is a second assertion indicated by the next to the last character which is a 3; as the signal continues and divides first through AND gate 1005 and then through amplifier 1006 there is another assertion indicated by the number 5 in the signal named BXXXX50 which indicates this is the third assertion of the signal. From the output of amplifier 1004 it is noted that the signal also divides and passes through AND gate 1009 and then through amplifier 1010 which again is the third assertion but now it is at a second level of the circuit and that level, in this case, is a 1; had there been a third level also the last character would have been a 2 and so on. Now the original signal BXXXXXX which is applied to input terminal 1000 is also applied to AND gate 1011 and Inverter 1012 producing a first inversion of the signal with this name and now shown as BXXXX00; the next to the last character is now a 0 indicating a first negation. As the signal continues through AND gate 1013 and inverter 1014 a second negation arises which is identified by the second to the last character being a 2 in the signal name BXXXX20.

Some further conventions shown on FIG. 10 and utilized in this disclosure follow. A filled in circle 1018 represents an internal source whereas a square such as 1019 represents an output connection pin. A small circle 1000 indicates an input connecting pin (except on the end of an amplifier, in which case it indicates an inverter). A square 1020 connected as shown on FIG. 10 indicates a flip-flop having output terminals 1021, 1022 to indicate the state of the flip-flop depending on which one is high. AND gate 1015 has two input terminals whereas the other AND gates shown have one input terminal. (Generally AND gates have more than one input terminal; however the single input AND gates are utilized herein to indicate that the signal is loaded similarly to a double input AND gate).

DETAILED DESCRIPTION OF THE PREFERRED EMBODIMENT

Figure 8A:
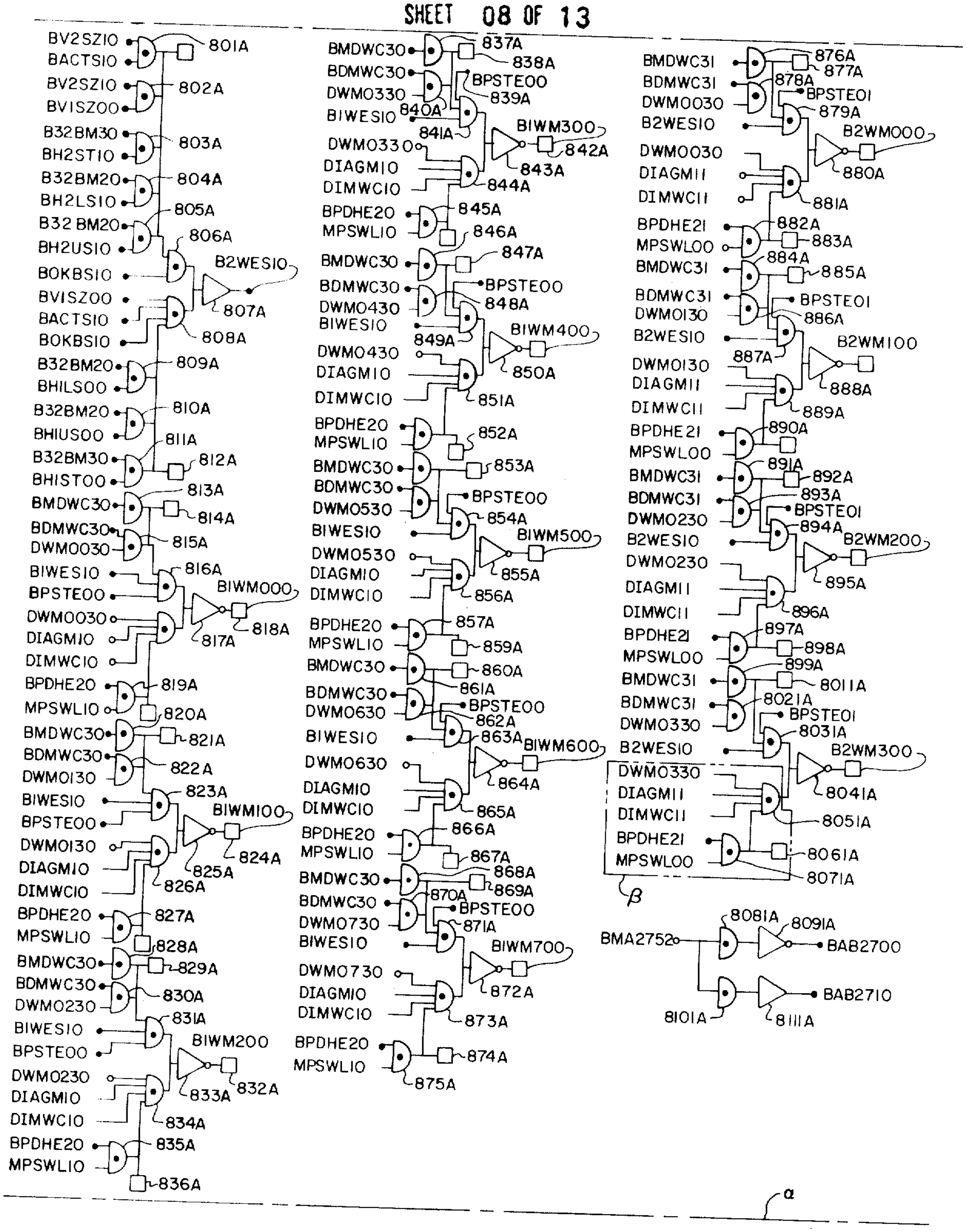
FIGS. 8*a* through 8*d* are logic block diagrams of the marking and mode selection structures of the invention.
Figure 8B:
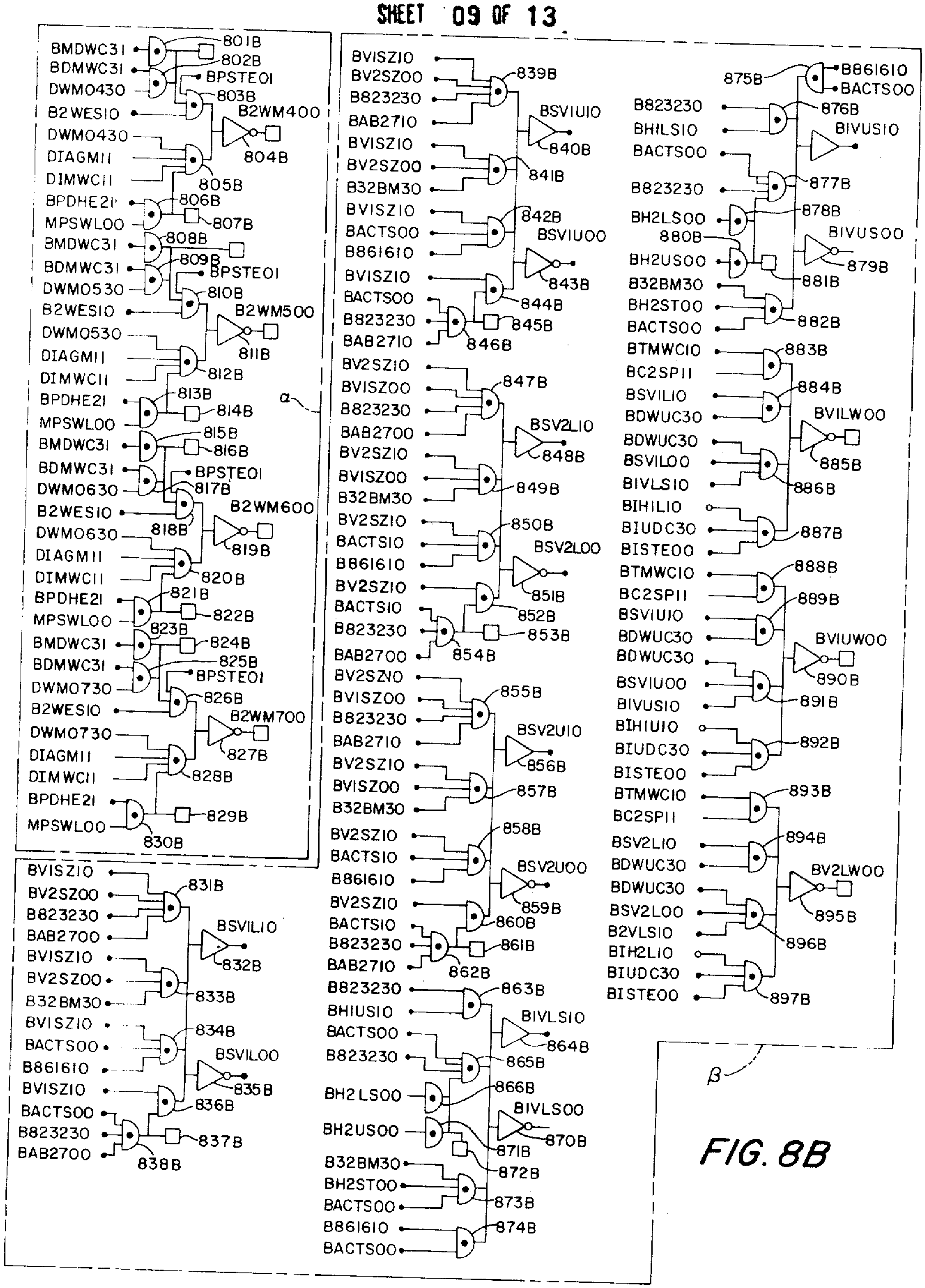
Figure 8C:
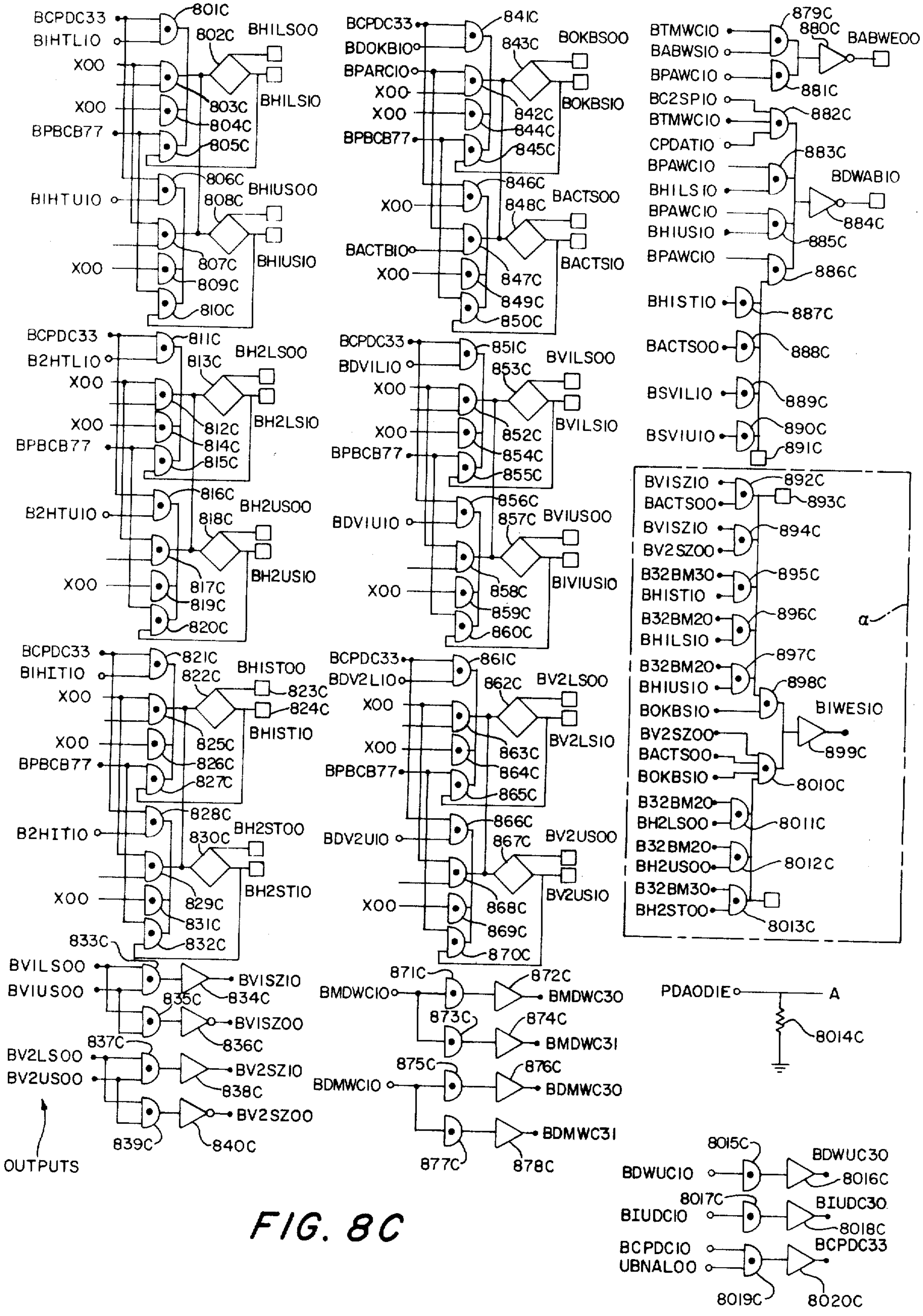
Figure 8D:
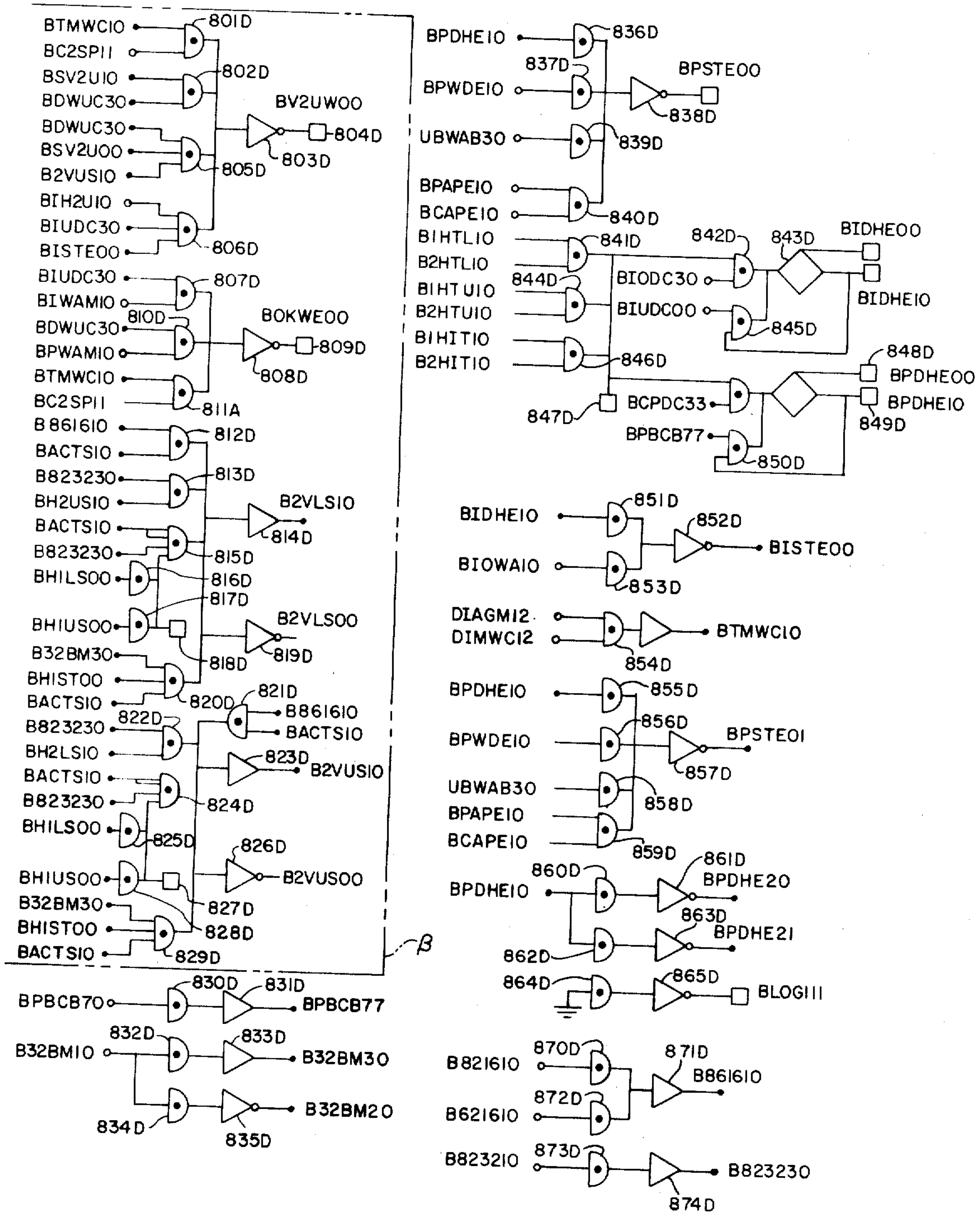
Figure 8E:
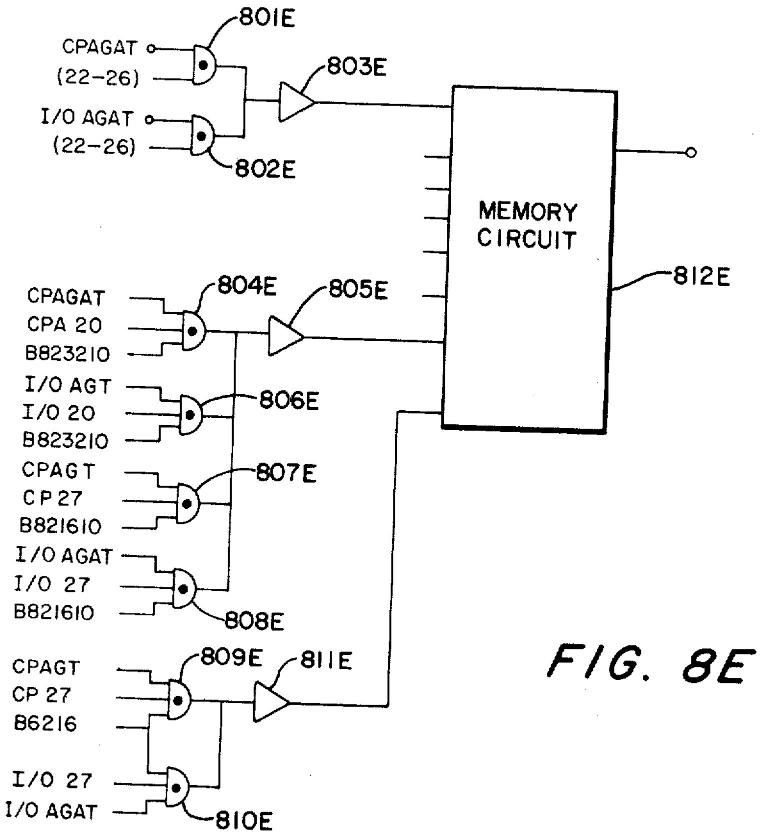
FIG. 8*e* is a logic block diagram of mode selection of the invention.

Referring to FIG. 8E there is shown a partial logic block diagram for dynamically selecting the mode of operation of the invention. (Similar logic block diagrams maybe utilized for selecting the mode desired). More specifically, there is shown memory circuit 812E which comprises one module of the buffer store memory. AND gates 801E and 802E are OR'ed together to the input terminal of amplifier 803E whose output terminal is coupled to memory circuit 812E. This portion of the input circuit to memory circuit 812E utilizes bits 22 through 26 (see FIG. 2A) to address the appropriate column of the memory circuit 812E. The appropriate address shown as input bits (22–26) is applied to AND gates 801E and 802E. Whether or not memory circuit 812E is addressed by the CPU unit or I/O unit is determined by the input signals CPAGAT and I/O AGAT which may be applied to AND gates 801E and 802E respectively. When the CPAGAT signal is high and the proper address is presented to AND gate 801E, it indicates that the CP is addressing the memory module 812E. Similarly, if the signal I/O AGAT is high with the appropriate address applied to AND gate 802E it indicates that the I/O unit is addressing the memory module 812E. Conflicts between the CP and the I/O are resolved by priority resolution unit 351 or FIG. 3, which is the subject of an invention in application Ser. No. 295,331 entitled Memory Store Sequencer by John L. Curley et al. filed on the same date as the instant application and assigned to the same assignee as the instant invention.

Once the appropriate column is selected it has previously been shown in connection with FIGS. 4, 5, 6 and 7 whether the word is in the upper or lower bank. How many bytes are delivered to or abstracted from buffer store depends also on the mode of operation previously described. FIG. 8E shows how this mode selection may be made. For example, if the 128 × 2 × 32 mode is desired wherein a 32 byte load is to be loaded or abstracted from buffer store, a function indentified as B823210 is high; when other appropriate signals are also high on the same AND gate the mode of operation will be 128 × 2 × 32. When it is desired to operate in the 128 × 2 × 16 mode a signal identified by the name B821610 must be high. (See Table 1). Referring to FIG. 8E it will be noted that AND gates 804E and 806E are the CP and I/O addressing gates for the 128 × 2 × 32 modes i.e., when signal B823210 (the 128 × 2 × 32 mode signal) gate is high and signals CPAGAT and CPA20 (bit 20 on FIG. 2A) are also high, and AND gate 804E is enabled and the CP has access to the buffer store for a single 16 byte word. (It will be noted by referring to FIG. 2A that bit 27 of block 204 denotes a double word (32 bytes) whereas bit 20 of block 203 denotes a single word (4 bytes). If on the other hand the input signals on AND gate 806E are all high that is the signals I/O AGT, (I/O enabling signal) I/O 20 (bit 20), and B823210 (128 × 2 × 32 mode) are high, then AND gate 806E is enabled and the I/O unit has access to the buffer store at the appropriate address previously addressed (as described supra) for a single word. By utilizing this analysis the other modes of operation may be also determined, since the physical and logic circuitry is similar in the lower buffer store module.

Referring now to FIGS. 8A through 8D, Exhibit I through VI and Table I (infra), there is shown logic block diagrams for mask control that controls the writing of data in the appropriate row (i.e., upper or lower bank) of the appropriate data module (i.e., upper or lower buffer store).

It will be noted that Table I and the Exhibits I to V refer to the various portions of buffer store and its organization in coded numerals and/or letters. The code is explained by reference to FIG. 4. Referring to FIG. 4 the upper module 304U of buffer store memory 104 is buffer module 1, whereas the lower module 304L is buffer module 2. The upper banks of buffer module 304U is row 1, or row upper whereas the lower bank of buffer module 304U is row 2 or row lower. Similarly, the upper bank of module 304L is row 1, or row upper and the lower bank is row 2 or row lower. 16 bytes are stored in a given row of a given column of a given module. Hence, a Hit 1 indicates a match has been made with a 32 byte word stored in buffer module 304U; whereas a Hit 1 upper indicates a match has been made with a 16 byte word stored in the upper bank (row upper) of upper module 304U (module 1).

It has been previously shown that data is stored in the buffer store in various modes. One mode is the 128 × 2 × 32 i.e. 128 columns each containing 1 blocked (32 bytes) of data; there being two buffer memory modules, each having 128 columns. (See pages 11 and 12 of this disclosure). Since each 16 bytes of each column forms a row, in a full block of 32 bytes there are 2 rows in a given column. It has previously been shown how to access any column and any 16 byte or 32 byte word in any of several modes. It was moreover shown that write channels have a maximum capability of writing a word 8 bytes wide. However, it is often necessary to write only a portion of a word one byte wide or 2 bytes wide up to 8 bytes wide. To do this it is necessary to develop mask fields 0 through 7 to mask out unwanted fields in order to write or read only portions of words. Referring therefore to those portions of FIGS. 8A, 8B, and 8C which are within the dash dot lines and are designated as *d* and also to Exhibit I, there is shown the logic block diagrams and logic expressions respectively for developing the initial conditions for replacing row 1 in buffer 1. Referring specifically to Exhibit I there is shown the logic expressions for generating a function (i.e. signal) B1WES (Buffer One Write Enable Set). Exhibit II shows the logic expressions or conditions for generating a function B2WES (Buffer Two Write Enable Set). These functions are similar and are similarly generated but pertain to different buffer modules. It will be noted from Exhibits I and II that there are 8 paragraphs in each of the Exhibits and each paragraph sets out the condition for generating the B1WES or B2WES function depending on whether Exhibit I and Exhibit II is referred to. The conditions of each statement represent the input signals of an AND gate and these AND gates are OR'ed together to feed an amplifier for generating the B1WES or B2WES signal.

To illustrate the foregoing refer to Exhibit I paragraph 1 which is a statement that says when validity bit one lower (V1L) and validity bit one upper (V1U) is a logical zero and when an activity bit (ACTB) is also logical zero and when an OK bit is a logical one then the function B1WES is generated. However, if V1L and V1U are both logical zero another signal BV1SZ10 (Buffer Validity Bit 1, Set to Logical Zero) may be generated and this signal may be substituted for V1L and V1U equal logical zero. The result is shown in Exhibit I paragraph 1*b*. The significance of the activity bit equal to the logical zero is that it points to buffer 1 row 1 (upper bank of upper module); conversely if activity bit is equal to logical 1 it points to buffer 2 row 2 (lower bank of lower buffer module 6).

Paragraph 2*b* of EXhibit I makes the Statement that when the signal BV1SZ10 is logical zero and BV2SZ00 is logical zero not (meaning it is logical 1) and when OK bit is logical 1 then once again the signal B1WES is generated. Note that BV1SZ10 by the convention shown on FIG. 10 is in the affirmative state and could have been written BV1SZ i.e. Buffer Validity 1 Set to Zero; whereas BV1SZ00 is negative and could have been written $\overline{BV1SZ}$ i.e. Buffer validity 1 not set to zero. However, the notation shown are in this instance preferred in this disclosure because it is consistent with the convention previously described although the alternative expression is perfectly valid and will be sometimes used where it is easier to read. Once again it will be noted that the signal BV2SZ is generated by V2L and V2U which come from a particular location in the buffer memory.

The third paragraph of Exhibit I makes the statement that if a 128 by 2 by 32 mode signal is true and that there has been a hit 1 stored (indicating the information desired is stored in the buffer store 1) and if the OK bit is true then once again the function B1WES is generated. The fourth paragraph of Exhibit I makes the statement that the 128 by 2 by 32 byte mode is not true and a hit one lower is stored, and the OK bit is logical 1 then the signal B1WES is once again generated. The fifth paragraph states that if there is a bit 1 upper stored and the 128 × 2 × 32 mode is not present and OK bit is logical 1 then B1WES is generated. The sixth paragraph makes the statement that if V2L and V2U is not logical zero and activity bit is logical zero and the 128 by 2 by 32 mode is true and a hit 2 (hit in buffer memory module 2) is not stored and an OK bit is logical 1 then once again the function B1WES is generated. Paragraph 7 makes the statement that if V2L and V2U are not zero, and activity bit is zero, and the 128 by 2 by 32 mode is not true and there is not a hit 2 lower stored then the signal B1WES is generated. Finally paragraph 8 makes the statement that if V2L and V2U is not zero, and activity bit is logical zero, and the 128 by 2 by 32 mode is not true and hit 2 upper is not stored (i.e. no such hit occurred) and OK bit is logical 1 then the signal B1WES is again generated.

Exhibit II indicates the conditions to replace row 2 buffer 2. All the conditions of Exhibit II are identical to Exhibit I except that the conditions are reversed. For example in the first paragraph of each Exhibit I and II, instead of having BV1SZ10, which is the validity bit one lower and validity bit one upper equal to zero, BV2SZ10, which is validity bit 2 lower and validity 2 upper, equal to zero. Moreover where an activity bit is present in any of the paragraphs of Exhibit II they will be set to logical 1 instead of logical zero as in Exhibit I.

Exhibit III A and III B indicate the conditions for developing functions B1WMO through B1WM7 and functions B2WMO through negatives B2WMO. (The B1WM 0 through 7 functions are the buffer one write mask zero through 7 functions, and the B2WM 0 through 7 functions are the buffer 2 write mask zero through 7 functions). The functions B1WES10 and B2WES10 previously developed are utilized in Exhibit III to develop the buffer word mask control signals. Paragraph 0 of Exhibit III A makes the statement that if function B1WES is true and the data write cycle (DWC) is true or if the signal B1WES is true and memory write cycle (MWC) is true and data write mask zero is true then a buffer one write mask control zero function (B1WM0) is generated. This generated signal points to the first byte of an 8 byte word which is to be masked. Simiarly seven more functions are generated for bytes 1 through 7 of an 8 byte word associated with buffer memory 1. Exhibit III B indicates how the buffer 2 write mask control functions for an 8 byte word associated with buffer memory 2 are generated. Hence any number of bytes 0 to 7 in an 8 byte word may be masked i.e. not written into or read from buffer store.

Referring to Exhibit IV there is shown the conditions of the various statements for developing the function BSV1U (Buffer Set Validity One Upper). Any one of the four statements will set the validity one upper bit i.e. validity bit for buffer memories 1, upper row. Statement number 1 says that the above statement is true when validity 1 lower and validity 1 upper is logical zero and validity 2 lower and validity 2 upper is not logical zero and the 16 byte load of the 128 by 2 by 32 mode is true and address bit 27 is set (i.e. is true). Statement 2 says that when buffer validity 1, (i.e. validity bit for buffer memory 1, includes rows upper and lower) stored equals zero is true and when buffer validity 2 (i.e. validity bit for buffer memory 2, upper and lower row) stored is equal to zero is not true and the buffer store is operating on 32 byte mode, then once again the validity one upper signal is generated i.e. validity one upper bit is set or equal to 1. The third statement says that buffer validity bit for buffer store 1 upper is set to logical 1 when buffer validity 1 set is zero (BV1SZ10) and activity bit is logical zero, and the buffer store is operating either in 128 by 2 by 16 mode or 256 by 2 by 16 mode. Statement number 4 states that the buffer validity one upper bit is set when buffer validity one stored is equal to logical zero and activity bit is logical zero and address bit 27 is set, and the buffer store memory is in the 128 by 2 by 32 mode.

Referring now to Exhibit V there is shown three statements which are utilized to develop the buffer validity one upper write function which in effect is the actual write mask for the validity bit one upper. The mask for the remaining validity bits may be developed in a similar manner. Statement 1 of Exhibit V says that write mask signal BV1UW is true when the function BSV1U10 is true and buffer directory write update cycle is true. This statement says that correct data is to be written into row 1 buffer 1 and therefore validity bit 1 upper must be set. Statement number 2 says that the write mask for buffer validity bit 1 upper, is developed when buffer directory write update cycle is true and buffer set validity one update is not true and the function buffer 1 validity upper set is true (the function B1VUS10 is developed in Exhibit VI). The third statement says that the write mask function for buffer validity bit 1 upper is developed by the I/O unit. The I/O unit invalidates validity bits only when new inputs from the I/O unit are made to the main memory and those inputs are also stored in the buffer store. Therefore the function BV1UW is true when the function BIH1U10

(buffer I/O hit on buffer store one upper has been made) and a function BIUDC30 is true indicating that there is a buffer I/O update cycle.

Referring now to Exhibit VI there are shown 6 statements for the function B1VUS to be true. The first statement says that the statement B1VUS is true when activity bit is logical zero and the buffer store is either in the 128 by 2 by 16 or the 256 by 2 by 16 modes. (861610) The second statement says that the function B1VUS is true when there has been a hit one lower and is stored (BH1LS10) and the buffer store is operating in the 128 by 2 by 32 mode with a 16 byte load (B823230). Statement 3 states that BV1US is true when activity bit is set to logical zero and the mode is 128 by 2 by 32 and there is no hit 2 lower (BH2LS) stored. The fourth statement says that function B1VUS is true when activity bit is logical zero and there has been no hit in buffer 2 upper BH2US00 and the unit is operating in 128 by 2 by 32 byte mode with a 16 byte load. The fifth statement says that B2VUS is true when the activity bit is a logical zero and there has been no hit in buffer 2 (BH2S00) and the unit is operating in a 32 byte load mode.

Having developed the various functions (i.e. signals) for implementing the invention the logic circuitry which will generate equivalent signals normally follows. The logic circuitry for developing the signal B1WES10 is shown on FIG. 8C labeled α and enclosed by dash-dot lines, and includes AND gates 892C–898C and 8010C–8013C and amplifier 899C; the logic circuitry for generating signal B2WES10 is shown on FIG. 8A and includes AND gates 801A–806A and 808A–812A and also amplifier 807A. The logic circuitry for generating signals B1WM000–B1WM700 and B2WM000–B2WM700, a total of 16 signals is shown on FIG. 8A in that portion of FIG. 8B labeled α down to and including AND gate 830B and amplifier 827B. The logic circuitry for developing signals BSV1L10 through BSV1U10 and signals BSV2L10 through BSV2U10 is similar to each other and is shown on FIG. 8B within the dash-dot lines labeled B beginning with AND gate 831B down through and including AND gate 863B and all amplifiers related thereto. Similarly, the logic circuitry for generating signals B1VLS10 through B1VUS00 are shown on FIG. 8B also, beginning with, and including all AND gates and amplifiers from AND gate 863B to AND gate 882B. Signals B2VLS through B2VUS may be generated with similar logic circuitry. Also, the logic circuitry for generating signals BV1LW00 through BV2LW00 and signals BV1UW00 to BV2UW00 are physically and functionally similar to each other and are shown on FIG. 8B as that circuitry comprising AND gates and amplifier starting with AND gate 883B down to and including AND gate 897B. FIG. 8C shows logic circuits which store the signals BH1LS00 and BH1LS10, BH1US00 and BH1US10, BH2LS00 and BH2LS10, BH2US00 and BH2US10, BH2US00 and BH2ST10, BOKBS00 and BOKBS10, BACTS00 and BACTS10, BV1LS00 and BV1LS10, BV1US00 amd BV1US10, BV2LS00 and BV2LS10, and BV2US00 and BV2US10. Utilizing the convention for the signal names and the symbols shown in the prior art diagram FIG. 10, Exhibits I through VI and Table I the FIGS. 8A through 8D are self-explanatory.

For example, to generate the signal B2WES10 on FIG. 8A, it is only necessary to OR together AND gates 801A–805A and apply the output of these gates as one input of AND gate 806A. The other input terminal of AND gate 806A has the signal BOKBS10 applied to it. Also AND gates 809A–811A are also OR'ed together with their output applied as one input of AND gate 808A. The other input signals applied to input terminals of AND gate 808A are BV1SZ00, BACTS10 and BOKBS10. AND gates 806A and 808A are then OR'ed together and their output signal is applied to the input terminal of amplifier 807A which generates the desired signal B2WES10. Following through FIGS. 8A8D they become self-explanatory when taken in conjunction with the convention hereinbefore defined.

Figure 9A:
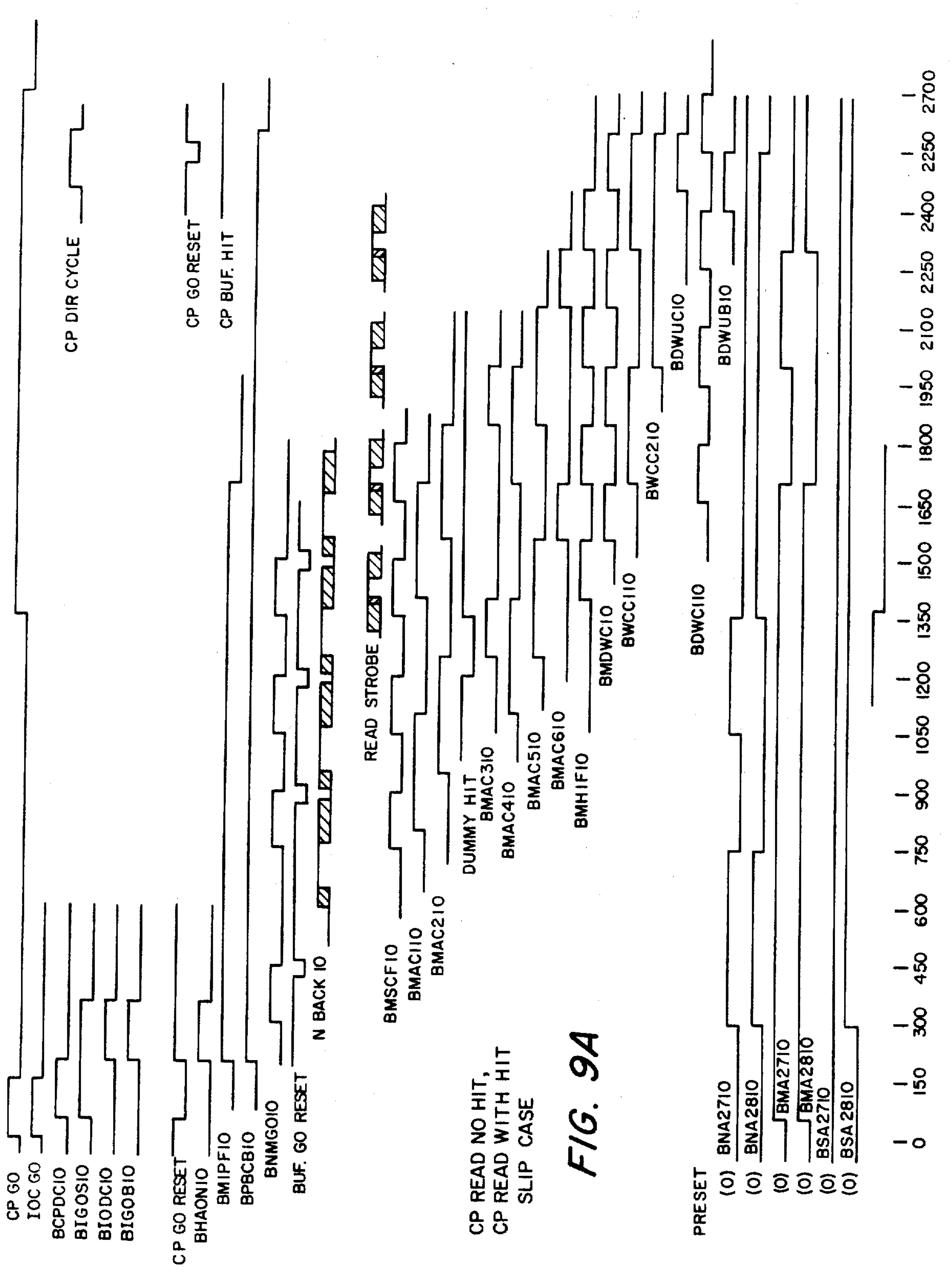
FIG. 9*a* shows timing diagrams of the invention.

Referring now to FIG. 9A, there is shown timing diagrams for a CP read with no hit and a CP read with a hit. The CPGO signal is a cycle generated within the CP that informs the buffer that a cycle is requested by the CP. The IOCGO signal is a comparable cycle that informs the buffer store that the I/O unit requests a cycle. Where there is contention for the buffer store between the CP and the IOC, the buffer store memory is allocated to the CP first. The BCPDC10 signal is a CP directory cycle; it is during this cycle that there is a determination as to whether or not the address sent by the CP is within the buffer memory and therefore has a "hit" or not. If no hit is obtained during this cycle, the function BHAON10 (ninth cycle from the top) is set. With a no hit in the buffer store directory, main memory is accessed to obtain the data requested by the CP. The buffer store system 300 on FIG. 3 then initiates two cycles BM1PF10 and BPBCB10. During the BM1PF10 cycle, the buffer store system 300 accesses the first eight bytes of data from main memory and sends four of the eight bytes to the CP and retains eight bytes. The BPBCB10 signal is a buffer busy signal and prevents any successive CP requests from entering the buffer store during this cycle. This signal will stay high until the four main memory requests from the CPU are fulfilled. Referring now to the fourth signal from the top BIGOS10 is utilized by the priority resolution logic to resolve any pending IO directory cycle conflicts. The BIODC10 signal is the I/O directory cycle which permits the I/O unit 307 to check the buffer directory module 305 for a hit. The illustrated case here indicates that the I/O unit did not make a hit and therefore releases the buffer directory. Had there been a hit, the signal B1UDC10 (Buffer 1 Update Cycle) would have gone high so that the I/O unit could have updated the buffer 1 store directory module. However, since in this instance there was no hit, the buffer IO update cycle is low and no update is made on the buffer directory. The CPGO reset signal is the inverse of the CPGO signal and acknowledges to the CP that it can reset the GO signal. The signal BNMGO10 is the GO signal issued by the buffer to the main memory to indicate that there has been a CP no hit condition in the buffer unit 300 and the buffer unit is issuing a GO request signal to the main memory in order to obtain the required information. The Buffer Go Reset signal below that is a cycle used by the main storage sequencer (See application Ser. No. 295,331 filed concurrently with the instant application) to achnowledge receipt of the buffer's GO signal and to indicate to the buffer to reset its GO signal. The NBACK10 signal is an acknowledge signal from main memory to the buffer indicating to the buffer that the main memory is handling the buffer request and the buffer can generate a new address or request. The READ STROBE signal is a signal from the buffer unit to the CP informing the CP that the four bytes requested by it are being deliverd. The BMSCF10 signal starts the counters used to count the number of clock cycles from the memory acknowledge signal to a time when the data is valid in the Buffer Store unit. It is utilized to determine whether or not there have been any timing slips on the buffer to main memory interface. The BMAC cycles 1–6 are counting cycles utilized to determine whether there have been any slips or not. The DUMMY HIT cycle is utilized only during the CP first pass request and it is utilized to install the CP if it has stopped writing for memory service. When the CP makes a request to the buffer, its clock is conditionally shut off and it is stalled and the DUMMY HIT signal starts the clock up again. The BMH1F10 signal is an error indication cycle. The BMDWC10 cycle is the data write cycle and is the interval during which data from main memory is written into the buffer modules. The BWCC1 and BWCC2 cycles are utilized to count the number of main memory requests that have been made by the buffer. The BDWUC10 signal is the data update cycle and is high only if an error has occurred during the four main memory accesses. If an error has occurred, the buffer unit zeroes the validity bits to indicate that the data contained in the buffer is not valid because of an error that occurred during writing. The BDWC1 signal is a cycle utilized to increment the address bits. The BDWUB signal is a buffer write update busy signal which solves conflicts between the I/O unit and the buffer. It prevents access by the I/O unit to the buffer during this period. The functions below this BNA27–28, BMA27–28, and BSA27–28 are address bits for incrementing the address for accesses to the different modules of main memory.

Having shown and described one embodiment of the invention, those skilled in the art will realize that many variations and modifications can be made to produce the described invention and still be within the spirit and scope of the claimed invention.

SPECIFICATION EXHIBITS

EXHIBIT I

CONDITIONS FOR DEVELOPING THE FUNCTION B1WES 1. (a) Validity bit 1 lower (V1L) and validity bit 1 upper (V1U) is logical zero AND activity bit (ACT B) is logical zero AND OK bit is logical 1; however, when V1L and V1U are both logical zero signal BV1SZ10 (Buffer Validity Bit 1 set to logical zero) is generated, then (1a) is:
   b. BV1SZ10 is logical 0. ACT B is logical zero. OK Bit is logical 1

+

2. (a) Validity bit 2 lower (V2L) and validity bit 2 upper (V2U) is logical zero AND V1L and V1U is logical zero AND-OK bit is logical 1 since when validity bit 2 lower (V2L and validity bit 2 upper (V2U) is logical zero signal BV2SZ (Buffer validity Bit 2 set to logical zero) is generated, the (2*a*) is:

b. BV1SZ10 is logical 0 · BV2SZ00 is not logical zero · OK Bit is logical 1

+

3. 128 × 2 × 32 Mode · Hit 1 is stored · OK bit is logical 1
4. $\overline{\text{128 × 2 × 32 Mode}}$ · Hit 1 lower is stored · OK bit is logical 1

+

5. $\overline{\text{128 × 2 × 32 Mode}}$ · Hit 1 upper stored · OK bit is logical 1

+

6. $\overline{\text{V2L. V2U is zero}}$ · ACT B is zero · 128 × 2 × 32 Mode · $\overline{\text{HIT 2 STORED}}$ · OK bit is logical 1

+

7. $\overline{\text{V2L. V2U is zero}}$ · ACT B is zero · $\overline{\text{128 × 2 × 32 Mode.}}$ $\overline{\text{HIT 2 lower stored}}$

+

8. $\overline{\text{V2L. V2U is zero}}$ · ACT B is zero · $\overline{\text{128 × 2 × 32 Mode.}}$ $\overline{\text{Hit 2 upper stored.}}$ OK bit is logical 1

=

B1WES10

EXHIBIT II

CONDITIONS FOR DEVELOPING THE FUNCTION B2WES 1 (a) (V2L. V2U is logical zero). ACT B is logical 1. OK bit is logical 1 or 1 (b) BV2SZ10. ACT B is logical. OK bit logical 1

+

2 (a) (V2L. V2U is logical zero). $\overline{\text{(V1L.V1U is logical zero)}}$. OK bit is logical 1 or 2 (b) BV2SZ10 · BV1SZ00 · OK bit is logical 1

+

3 (a) 128 × 2 × 32 Mode. Hit 2 is stored. OK bit is logical 1.
Since HIT 2 STORED IS BH2ST · OK bit logical 1 b. 128 × 2 × 32 Mode · BH2ST · OK bit logical 1

+

4. $\overline{\text{128 × 2 × 32}}$. HIT 2L STORED · OK bit is logical 1

+

5. 128 × 2 × 32 · Hit 2 U STORED · OK bit is logical 1

+

6. $\overline{\text{(V1L.V1U is zero)}}$ · ACT B is logical 1. 128 × 2 × 32 Mode. $\overline{\text{HIT 1 STORED.}}$ OK bit is logical 1
7. $\overline{\text{(V1L.V1U is zero)}}$ · ACT B is logical 1 $\overline{\text{128 × 2 × 32 Mode}}$ .$\overline{\text{HIT 1 LOWER STORED}}$ · OK bit to logical 1

+

8. ($\overline{\text{V1L. V1U is zero}}$). ACT B is logical 1 $\overline{128 \times 2 \times 32}$ Mode
.HIT 1 UPPER STORED · OK bit is logical 1

=

B2WES10

EXHIBIT III A

CONDITIONS FOR DEVELOPING WRITE MASK BITS B1WM0 through B1WM7

0 (B1WES10 . DWC30) + (B1WES10 . MWC.DWM0030) = B1WM000
1 (B1WES10 . DWC30) + (B1WES10 . MWC.DWM0130) = B1WM100
2 (B1WES10 . DWC30) + (B1WES10 . MWC.DWM0230) = B1WM200
3 (B1WES10 . DWC30) + (B1WES10 . MWC.DWM0330) = B1WM300
4 (B1WES10 . DWC30) + (B1WES10 . MWC.DWM0430) = B1WM400
5 (B1WES10 . DWC30) + (B1WES10 . MWC.DWM0530) = B1WM500
6 (B1WES10 . DWC30) + (B1WES10 . MWC.DWM0630) = B1WM600
7 (B1WES10 . DWC30) + (B1WES10 . DWM0730) = B1WM700

EXHIBIT III B

CONDITIONS FOR DEVELOPING WRITE MASK BITS B2WM0 through B2WM7

0 (B2WES10 . DWC30) + (B2WES10 . MWC.DWM0030) = B2WM000
1 (B2WES10 . DWC30) + (B2WES10 . MWC.DWM0130) = B2WM100
2 (B2WES10 . DWC30) + (B2WES10 . MWC.DWM0230) = B2WM200
3 (B2WES10 . DWC30) + (B2WES10 . MWC.DWM0330) = B2WM300
4 (B2WES10 . DWC30) + (B2WES10 . MWC.DWM0430) = B2WM400
5 (B2WES10 . DWC30) + (B2WES10 . MWC.DWM0530) = B2WM500
6 (B2WES10 . DWC30) + (B2WES10 . MWC.DWM0630) = B2WM600
7 (B2WES10 . DWC30) + (B2WES10 . MWC.DWN0730) = B2WM700

EXHIBIT IV

CONDITIONS FOR DEVELOPING THE FUNCTION (BUFFER SET VALIDITY 1 UPPER)

1. (a) (V1L.V1U) is logical zero. ($\overline{\text{V21.V2U}}$) is logical zero.
128 × 2 × 32 mode 16 byte load . Address bit 27
(b) BV1SZ10.BV2SZ00 . 128 × 2 × 32 Mode . Address bit 27

+

2. BV1SZ10 . BV2SZ00 . 32 byte mode

+

3. BV1SZ10 . ACT B is logical zero . (128 × 2 × 16 mode + 256 × 2 × 16 mode)

+

4. BV1SZ10 . ACT B is logical zero. 128 × 2 × 32 mode
.Address bit 27

=

BSV1U10

EXHIBIT V

CONDITIONS FOR DEVELOPING FUNCTION BV1UW (BUFFER VALIDITY 1 UPPER WRITE)

1. BSV1U10 . BDWUC30

+

2. BDWUC30 . BSV1VU00 . B1VUS10

+

3. BIH1U10 . BIUDC30

=

BV1UW

EXHIBIT VI

CONDITIONS FOR DEVELOPING THE FUNCTION B1VUS (BUFFER 1 VALIDITY UPPER SET)

1. B861610.ACT B is logical zero

+

BH1LS10
2. ($\overline{\text{Hit 1 lower stored.}}$) · B823230 (16 byte load)

+

BH2LS00
3. BACTS is logical 0 . B823230.$\overline{\text{HIT 2 Lower Stored}}$

+

BH2US00
4. ACTS is logical zero . B823230 . $\overline{\text{HIT 2 Upper Stored}}$

+

BH2US00
5. B32BM30 . $\overline{\text{HIT 2 STORED}}$ . ACTS is logical 0

=

B1VUS10

SPECIFICATION TABLE

TABLE I
SIGNAL/FUNCTION DEFINITIONS

| Sig./Funct. Name | Definition |
|---|---|
| Negates<br>1. BV1SZ00 | V1L and V1U stored are not zero. |
| Affirms<br>2. BV1SZ10 | V1L and V1U stored are zero. |
| 3. V1L | Validity bit, Buffer Store 1, Lower Bank. |
| 4. V1U | Validity bit, Buffer Store 1, Upper Bank. |
| 5. V2U | Validity bit, Buffer Store 2, Upper Bank. |
| 6. V2L | Validity bit, Buffer Store 2, Lower Bank. |
| 7. BV2SZ00 | V2L and V2U stored are not zero. |
| 8. BV2SZ10 | V2L and V2U stored are zero. |
| 9. BACTS10 | Buffer Activity Bit Stored in a flip-flop FIG. 8C. |
| 10. BACTS00 | Activity Bit Not Stored in flip-flop. |
| 11. BV2SZ 00 10 | V2L and V2U stored are/are not zero, depending on suffix: 00=No; 10=Yes. (Suffixes will hence forth be left off, in this table.) |
| 12. BH1ST | CP hit on Buffer-Store 1 Stored; Yes/No. |

SPECIFICATION TABLE -Continued

TABLE I
SIGNAL/FUNCTION DEFINITIONS

| Sig./Funct. Name | Definition |
|---|---|
| 13. BH2ST | CP hit on Buffer-Store 2 Stored; Yes/No. |
| 14. BH1LS | CP hit on Buffer-Store 1 Lower Bank, Stored; Yes/No. |
| 15. BH1US | CP hit on Buffer-Store 1, Upper Bank, Stored; Yes/No. |
| 16. BH2LS | CP hit on Buffer-Store 2, Lower Bank, Stored; Yes/No. |
| 17. BH2US | CP hit on Buffer-Store 2, Upper Bank, Stored; Yes/No. |
| 18. BIHTL | 18–23 are same as 12–17 except I/O unit makes "hit". |
| 19. BIHTU | |
| 20. BIH1L | |
| 21. BIH1U | |
| 22. BIH2L | |
| 23. BIH2U | |
| 24. BPSTE | Stored Error. |
| 25. DIAGM | Diagnostic Mode |
| 20. DIMWC | Diagnostic Mode Write Cycle |
| 21. BPDHE | Diagnostic Mode Error |
| 22. MPSWL | Maint. Panel Switch |
| 23. BPMWC | Data Module Write Cycle |
| 24. DWMO | CP Write Mask, Byte 0 |
| 25. DWM1 | CP Write Mask, Byte 1 |
| 26. DWM2 | CP Write Mask, Byte 2 |
| 27. DWM3 | CP Write Mask, Byte 3 |
| 28. DWM4 | CP Write Mask, Byte 4 |
| 29. DWM5 | CP Write Mask, Byte 5 |
| 30. DWM6 | CP Write mask, Byte 6 |
| 31. DWM7 | CP Write Mask, Byte 7 |
| 32–40 B1WM0-7 | Buffer-Store 1 Write Control Bytes 0–7 |
| 40–48 B2WM0-7 | Buffer-Store 2 Write Control Bytes 0–7 |
| 49. BAB 27 | Buffer Address Bit 27 |
| 50. BDWUC | Buffer Directory Write Update Cycle |
| 51. BIUDC | Buffer I/O Update Cycle |
| 52. BSV1U | Buffer Set Validity Bit 1 Upper |
| 53. BSV2U | Buffer Set Validity Bit 2 Upper |
| 54. BSV1L | Buffer Set Validity Bit 1 Lower |
| 55. BSV2U | Buffer Set Validity Bit 2 Lower |
| 56. B1WES | Buffer-Store 1 Write Enable Set |
| 57. B2WES | Buffer-Store 2 Write Enable Set |
| 58. BV1UW | Buffer Validity Bit 1 Upper Write |
| 59. BV1LW | Buffer Validity Bit 1 Lower Write |
| 60. BV2UW | Buffer Validity Bit 2 Upper Write |
| 61. BV2LW | Buffer Validity Bit 2 Lower Write |
| 62. BV1LS | Buffer Validity Bit 1 Lower Stored |
| 63 BV1US | Buffer Validity Bit 1 Upper Stored |
| 64. BV2LS | Buffer Validity Bit 2 Lower Stored |
| 65. BV2US | Buffer Validity Bit 2 Upper Stored |
| 66. BCPDC | Buffer CP Directory Cycle |
| 67. BCBCB | Buffer Cycle Busy |
| 68. BOKBS | Buffer OK-Bit Stored |
| 69. BDWUC | Buffer Directory Write Update Cycle |
| 70. CPDAT | CP Data |
| 71. BPAWC | Buffer Processor Activity Write Cycle |
| 72. B32BM | Buffer 32 Byte Mode |
| 73. B8232 | 128 × 2 × 32 Mode |
| 74. B8616 | 128 × 2 × 16 or 256 × 2 × 16 Mode |
| 75. BOKWE | BOK Write Enable |
| 76. BACTB | Buffer Activity Bit |
| 77. BDV1L | Buffer Directory Validity 1 Lower |
| 78. BDV1U | Buffer Directory Validity 1 Upper |
| 79. BDV2L | Buffer Directory Validity 2 Lower |
| 80. BDV2U | Buffer Directory Validity 2 Upper |
| 81. BPAWC | Buffer Processor Activity Write Cycle |
| 82. BCPDC | Buffer CP Directory Cycle |
| 83. BTMWC | Memory Write Cycle |
| 84. BPWDE | Processor Data Error |
| 85. UBWAB | Processor Write Abort |
| 86. BPAPE | Processor Parity Error |
| 87. BIDHE | I/O Dual Hit Error — 2 Hits at same time |
| 88. BIOWA | I/O Write Abort |
| 89. BPDHE | Processor Dual Hit Error |
| 90. BIODC | I/O Directory Cycle |
| 91. BPBCB | Buffer Processor Cycle Busy |
| 92. BLOG1 | Logical 1 (Grounded Wires) |

What is claimed is:

1. A computer system having a data processor and a main memory, for storing real addresses and information, said system comprising:

a. a buffer store of lower capacity and lower access time than said main memory, said buffer store for copying portions of information from said main memory and being dynamically controllable to operate in a plurality of multiple size mapping modes;

b. control means, coupled to said buffer store and responsive to an instruction from a program then being executed in said data processor, for dynamically controlling said buffer store for altering the then existing mapping mode of said buffer store;

c. directory means, coupled to said buffer store, said directory means for storing selected ones of the real addresses of said main memory; and, d. means responsive to a selected one of said real addresses for storing in said buffer store selected information indicated by the selected address in said main memory wherein the selected information indicated by the selected address of said main memory is stored in said buffer store, as well as in said main memory.

2. A computer system as recited in claim 1 including, coupled to said directory means, compare means for comparing a selected real address, in said instruction, of said main memory information also located in said buffer store, with said real addresses also stored in said directory means.

3. A computer system as recited in claim 2 wherein said mapping modes of operation of said buffer store include a normal mapping mode (A by B by C) wherein said buffer store is capable of storing A columns of one block (i.e. C bytes) or a half-block (i.e. C/2 bytes) of information per column; a (A by B by C/2) mapping mode wherein said buffer store is capable of storing A columns of a half-block (i.e. C/2 bytes) of information per column; a (E by B by C/2) mode wherein said buffer store is capable of storing E columns of half-block of information (i.e. C/2 bytes) per column, and wherein B is any division of said buffer store.

4. A computer system as recited in claim 3 wherein said mapping modes of operation of said buffer store include a by-pass mode wherein said buffer store is not utilized and all accesses for information are made to main memory.

5. A computer system as recited in claim 4 including means, coupled to said main memory and responsive to a program under execution, for dynamically entering the by-pass mode.

6. In combination with a general purpose computer system having a central processor, a multi-level storage system comprising:

a. a main memory for storing programs and data;

b. a buffer store comprising two modules, a first module and a second module, each module capable of storing information in any one of a plurality of mapping modes;

c. first means coupled to said main memory and buffer store for determining whether or not information requested by the computer system is in said buffer store;

d. second means coupled to said main memory and buffer store and also responsive to said first means for delivering information from said buffer store to said central processor when the information resides in said buffer store; and, e. third means coupled to said buffer store and responsive to a program then being under execution by said computer system, said third means for dynamically altering the existing mapping mode of operation of said buffer store.

7. The combination of claim 6 including fourth means, coupled to said main memory and buffer store and also responsive to said first means, for cyclically delivering information from said main memory to said buffer store.

8. The combination of claim 7 wherein a portion of information requested by the computer system is delivered to the computer system from said main memory, and the remainder of the requested information is delivered from main memory to said buffer store on a first cycle.

9. The combination of claim 8 wherein the remaining portion of information requested by the computer system is delivered to the computer system from said buffer store in one or more additional cycles.

10. The combination of claim 9 including maintenance panel means, coupled to said first and third means, for dynamically controlling the use or non-use of the by-pass mode.

11. A computer multi-level storage system comprising:

a. a four-way interleaved random access main memory comprised of 4 memory modules;

b. a buffer store coupled to said main memory, said buffer store operable at any given time in any one of a plurality of modes, said buffer store comprising at least two modules, a first module and a second module;

c. directory means coupled to said buffer store, said directory means for storing address fields, validity bit fields, activity bit fields and OK bit fields; and d. first selection means coupled to said buffer store and responsive to said directory means for selecting one of said modules of said buffer store.

12. A computer multi-level storage system as recited in claim 11 wherein each of said first module and second module is divided into at least a first bank and a second bank, and further including second selection means coupled to said first and second banks and responsive to said directory means, said second selection means for selecting one of said first or second banks.

13. A computer multi-level storage system as recited in claim 12 wherein the validity bit fields stored in said directory means comprise a validity one upper (V1U) and validity 2 upper (V2U) bit fields associated with an address pertaining to the first and second banks respectively of said first module, and wherein said validity bit fields further comprise validity 1 lower (V1L) and validity 2 lower (V2L) bit fields associated with an address pertaining to the first and second banks of said second module, said validity bit fields indicating the validity or invalidity of the data addressed by their associated address.

14. A computer multi-level storage system as recited in claim 13 including set means, coupled to said directory means, said main memory and said buffer store for setting selected ones of said validity bit fields to indicate invalid data whenever the information addressed in said buffer store does not correspond to information stored in said main memory.

15. A computer multi-level storage system as recited in claim 11 including activity bit set means, coupled to said directory means and buffer store, for setting the activity bit field to indicate a least recently used buffer store module bank.

16. A computer multi-level storage system as recited in claim 11 including memory address means, coupled to said first module and said second module, for addressing said buffer store by an instruction having column, module and double word fields.

17. A computer multi-level storage system as recited in claim 16 including compare means for comparing the address in said directory means to the address in said memory address means.

18. A computer multi-level storage system as recited in claim 17 wherein the instruction in said memory address means has a module and column address, and the address in said directory means has a third module and a fourth module address, and wherein the module address in said memory address means is compared to the third module and fourth module address of the directory means column addressed by the column address of the instruction in said memory address means.

19. A computer multi-level storage system as recited in claim 18 wherein a successful compare (i.e. a hit) indicates the information addressed is in the buffer store.

20. A computer multi-level storage system as recited in claim 18 wherein an unsuccessful compare (i.e. a miss) indicates the information addressed is in main memory.

21. A computer system having a data processor and a main memory for storing computer words, said computer system comprising:

a. a buffer store of lower capacity and lower access time than said main memory, said buffer store comprising a plurality of buffer-store locations for storing selected ones of said computer words in selected ones of said buffer store locations;

b. directory means, coupled to said buffer store and comprising a plurality of directory locations in said directory means, each location in said directory means having a corresponding location in said buffer store and each directory means location having a corresponding address as said corresponding buffer store locations, each of said directory means locations for storing the main memory address of a selected one of said computer words stored in a corresponding buffer store location, whereby a computer word stored in said buffer store is referenced to its location in main memory by the address stored in said directory means, and whereby the location of said computer word stored in said buffer store is referenced relative to its directory location by the corresponding location that said computer word and said computer word address occupies in its respective location of said buffer store and said directory means; and, c. means coupled to said buffer store and said directory means, for altering the existing number of locations of said buffer store and said directory means.

22. A computer system as recited in claim 21 including, coupled to said directory means, compare means for comparing the addresses located in said directory means with an address of said main memory.

23. A computer system as recited in claim 22 wherein said buffer store includes a normal mode (A by B by C) wherein said buffer store is capable of storing A columns of one block (i.e. C bytes) or a half-block (i.e. C/2 bytes) of information per column; a A by B by C/2 mode wherein said buffer stores is capable of storing A columns of a half-block (i.e. C/2 bytes) of information per column; a E by B by C/2 mode wherein said buffer store is capable of storing E columns of half-block of information (i.e. C/2 bytes) per column, and wherein B is any division of said buffer store, and further including word size varying means coupled to said buffer store for varying the size of the word stored in said buffer store.

24. A computer system as recited in claim 23 including word-quantity varying means for varying the number of said computer words that may be stored in said buffer store.

25. A computer system as recited in claim 24 including means, coupled to said main memory, for by-passing said buffer store and making all accesses for information direct to main memory.

26. A computer system having a data processor and a main memory for storing computer words, said computer system comprising:

a. first means having first store locations for storing addresses of corresponding selected ones of said computer words in selected ones of said first store locations;

b. second means, coupled to said first means, having second store locations for storing said selected ones of said computer words in selected ones of said second store locations of said second means, said selected ones of said second store locations having similar corresponding addresses as said corresponding selected ones of said first store locations; and, c. third means for varying the storage capacity of said first and second store locations.

27. A computer system as recited in claim 26 including fourth means, coupled to said first and second means, for varying the number of said first and second store-locations.

28. The computer system as recited in claim 27 including fifth means, coupled to said first and second means, for varying the length of said computer word stored in said first store locations.

29. The computer system as recited in claim 28 including sixth means, coupled to said second means and to said main memory for by-passing said second means and making all information accesses directly to main memory.

30. The computer system as recited in claim 29 including seventh means, coupled to said first and second means and to said main memory, for delivering to the computer system a portion of the information requested by the computer system from said main memory, and delivering the remainder of requested information from main memory to said second means.

31. A computer multi-level storage system comprising:

a. an N way interleaved random accessed main memory comprised of N memory modules for storing a plurality of computer words, each word stored in said memory being allocated in equal portions among said N-modules;

b. a buffer store, coupled to said main memory, comprising at least a first module and a second module, said modules having a plurality of storage locations for storing equal portions of selected ones of said computer words in each of said first and second modules;

c. directory means coupled to said buffer store, said directory means for storing address fields of said selected ones of said computer words, validity bit fields, activity bit fields and O.K. bit fields for determining the status of said selected ones of said computer words in said buffer store; d. first selection means coupled to said buffer store and responsive to said directory means for selecting one of said modules of said buffer store for accessing first portions of said selected ones of said computer words; and, e. second selection means coupled to said buffer store and responsive to said directory means for selecting the other of said modules of said buffer store for accessing second portions of said selected ones of said computer words.

32. A computer multi-level storage system as recited in claim 31 wherein each of said first module and second module is divided into at least a first bank and a second bank, and further including third selection means coupled to said first and second banks and responsive to said directory means, said third selection means for further selecting one of said first or second banks for accessing said portions of selected ones of said computer words.

33. A computer multi-level storage system as recited in claim 32 wherein the validity bit fields stored in said directory means comprise a validity (1) upper (V1U) and validity (2) upper (V2U) bit fields associated with an address pertaining to the first and second banks respectively of said first module, and wherein said validity bit fields further comprise validity 1 lower (V1L) and validity (2) lower (V2L) bit fields associated with an address pertaining to the first and second banks of said second module, said validity bit fields indicating the validity or invalidity of the data addressed by their associated address.

34. A computer multi-level storage system as recited in claim 33 including set means, coupled to said directory means, said main memory and said buffer store for setting selected ones of said validity bit fields to indicate invalid data whenever the information addressed in said buffer store does not correspond to information stored in said main memory.

35. A computer multi-level storage system as recited in claim 31 including activity-bit set means, coupled to said directory means and buffer store, for setting the activity bit field to indicate a least recently used buffer store module bank.

36. A computer multi-level storage system as recited in claim 31 including memory address means, coupled to said first module and said second module, for addressing said buffer store by an instruction having column, module and double word fields.

37. A computer multi-level storage system as recited in claim 36 including compare means for comparing the address in said directory means to the address in said memory address means.

38. A computer multi-level storage system as recited in claim 37 wherein the instruction in said memory address means has a module and column address, and the address in said directory means has a third module and a fourth module address, and wherein the module address in said memory address means is compared to the third module and fourth module address of the directory means column addressed by the column address of the instruction in said memory address means.

39. A computer multi-level storage system as recited in claim 38 wherein a successful compare (i.e. a hit) indicates the information addressed is in the buffer store.

40. A computer multi-level storage system as recited in claim 39 wherein an unsuccessful compare (i.e. a miss) indicates the information addressed is in main memory.

* * * * *

UNITED STATES PATENT OFFICE
CERTIFICATE OF CORRECTION

Patent No. 3,820,078 Dated June 25, 1974

Inventor(s) John L. Curley, Thomas J. Donahue, Wallace A. Martland and Benjamin S. Franklin It is certified that error appears in the above-identified patent and that said Letters Patent are hereby corrected as shown below:

Column 24, line 67, delete "s" in the word --stores--.

Column 26, line 6, begin new paragraph with the letter --d.--.

Signed and sealed this 15th day of October 1974.

(SEAL)
Attest:

McCOY M. GIBSON J.
Attesting Officer

C. MARSHALL DANN
Commissioner of Patents

USCOMM-DC 60376-P69
★ U.S. GOVERNMENT PRINTING OFFICE : 1969 O—366-334